United States Patent

Satake et al.

[11] Patent Number: 6,049,597
[45] Date of Patent: Apr. 11, 2000

[54] DATA COMMUNICATION SYSTEM BETWEEN A PERSONAL COMPUTER AND FACSIMILE MACHINE THROUGH AN INTERFACE

[75] Inventors: Makoto Satake, Yokohama; Atsushi Ikeda, Tokorozawa, both of Japan

[73] Assignee: Canon Kabushiki Kaisha, Tokyo, Japan

[21] Appl. No.: 08/954,747

[22] Filed: Oct. 20, 1997

[30] Foreign Application Priority Data

| Oct. 29, 1996 | [JP] | Japan | ................................. 8-303579 |
| Jul. 23, 1997 | [JP] | Japan | ................................. 9-197011 |
| Aug. 29, 1997 | [JP] | Japan | ................................. 9-249789 |

[51] Int. Cl.[7] .............................................. H04M 11/00
[52] U.S. Cl. ............................ 379/93.08; 379/100.05; 379/100.06; 358/440
[58] Field of Search ......................... 379/93.08, 93.05, 379/93.17, 90.01, 100.14, 100.05, 100.06, 93.01, 100.09, 100.01; 358/400, 440, 468, 434; 395/114

[56] References Cited

U.S. PATENT DOCUMENTS

| 5,479,500 | 12/1995 | Matsuzaki et al. ................. 379/100.14 |
| 5,720,014 | 2/1998 | Ikeda et al. ............................. 395/114 |
| 5,761,399 | 6/1998 | Asano ....................................... 358/442 |

FOREIGN PATENT DOCUMENTS

| 0401804 | 12/1990 | European Pat. Off. . |
| 92/01172 | 8/1992 | WIPO . |
| 93/00010 | 8/1993 | WIPO . |
| 95/06386 | 3/1995 | WIPO . |

*Primary Examiner*—Curtis A. Kuntz
*Assistant Examiner*—Melur Ramakrishnaiah
*Attorney, Agent, or Firm*—Fitzpatrick, Cella, Harper & Scinto

[57] ABSTRACT

In a data communication system in which an information processing terminal and a data communication apparatus are connected to each other via an interface, and the data communication apparatus executes data communication in response to an instruction from the information processing terminal, the data communication apparatus determines error calling in the instructed data communication, and notifies the information processing terminal of the determination of error calling. The information processing terminal disables an instruction of data communication to an address corresponding to the error calling based on the notification of the determination of error calling.

60 Claims, 17 Drawing Sheets

DATA COMMUNICATION SYSTEM BETWEEN A PERSONAL COMPUTER AND FACSIMILE MACHINE THROUGH AN INTERFACE

BACKGROUND OF THE INVENTION

1. Field of the Invention

This invention relates to a data communication system which includes an information processing terminal, such as a personal computer (hereinafter abbreviated as a "PC") or the like, and a data communication apparatus connected to each other via an interface, and in which the data communication apparatus executes data communication in accordance with an instruction from the information processing terminal.

2. Background of the Invention

As a data communication system of this type, a system, in which a facsimile apparatus capable of operating even in a stand-alone state and a PC are connected to each other via a predetermined interface, and the facsimile apparatus performs calling processing and transmission processing in accordance with a request of calling and a request of transmission, respectively, from the PC, has been known.

Stand-alone facsimile apparatuses not connected to PC's, which, when a communication partner's apparatus having a telephone number assigned for facsimile transmission is not a facsimile apparatus but is a telephone set for general conversation due, for example, to a failure in input of the telephone number, automatically disable facsimile transmission to that telephone number in consideration of annoyance to the communication partner, have been known.

That is, when facsimile transmission cannot be normally performed including a busy state of the line although calling has been performed to an assigned communication partner, automatic redialing is usually performed about 3 to 5 times as a default operation until facsimile transmission is normally performed.

When a person responds instead of a facsimile apparatus because a wrong telephone number has been assigned, also, the communication partner will be annoyed if automatic dialing is performed.

In the following description, a case in which a person responds instead of a facsimile apparatus will be hereinafter termed "error dialing" corresponding to a typical cause of the case.

In one approach, a one-touch dial key capable of easily assigning a communication partner with a single button operation is used for inputting the telephone number of the partner. In such an approach, however, if a wrong telephone number is registered in the one-touch dial key, there is the possibility that the one-touch dial key is used several times until the user notices that the registered number is wrong.

In order to solve such a problem, stand-alone facsimile apparatuses, in which, for example, even if five redialing operations are set, when two probable error dialing operations are present, redialing is interrupted, and the used one-touch dial key and other dial keys where the same telephone number as that dial key is registered are disabled, have been provided.

There are two conventional types of facsimile systems, in which a PC and a facsimile apparatus are connected to each other, and which can execute facsimile transmission based on an instruction from the PC, with respect to facsimile transmission based on an instruction from the PC.

In one system, information relating to a communication partner and all image information relating thereto are stored together, and calling and transmission are thereafter performed. In another system, only information relating to the address and the like of a communication partner is stored, and transmission is performed after calling by sequentially receiving image information from the PC.

However, in conventional facsimile systems in which a PC and a facsimile apparatus are connected to each other and which can execute facsimile transmission based on an instruction from the PC, determination of error dialing and processing of disabling the error dialing as in the above-described stand-alone facsimile apparatuses are not performed.

That is, in most of facsimile systems in which a PC and a facsimile apparatus are connected to each other, software of the PC side controls a telephone directory having the same effect as the one-touch dial key in the stand-alone facsimile apparatuses. However, when facsimile transmission instructed using the telephone directory at the PC side results in error dialing, the telephone directory at the PC side is not disabled as in the case of the stand-alone facsimile apparatuses.

Furthermore, there is no such a system in which a disabled state due to error dialing applied to a one-touch dial key of the facsimile apparatus is applied to the telephone directory of the PC side, and the disabled state due to error dialing applied to the telephone directory at the PC side is applied to the one-touch dial key of the facsimile apparatus, to synchronize the disabled states of the dials at both sides.

In a facsimile system of a type in which only information relating to the address and the like of a communication partner is stored, and transmission is performed while sequentially receiving image information from the PC, in a conventional method of performing scheduling of transmission queue only by the main body of the apparatus, it is difficult to construct the above-described system of synchronizing the disabled states of dials at both sides.

SUMMARY OF THE INVENTION

The present invention has been made in consideration of the above-described problems.

It is an object of the present invention to improve a system including a PC and a data communication apparatus connected to each other via an interface.

It is another object of the present invention to allow, in a data communication system in which a PC and a data communication apparatus are connected to each other, and the data communication apparatus executes data communication based on an instruction from the PC, determination of error calling and processing of disabling calling which are effective for data communication based on an instruction from the PC.

It is still another object of the present invention to allow, in a data communication system of first receiving information relating to the address and the like of a communication partner from a PC by a data communication apparatus and storing the received information, and transmitting data from the PC from the data communication apparatus to a called partner, consistency of the disabled states at both of the PC and the data communication apparatus.

It is yet another object of the present invention to allow, in a data communication system in which a PC and a data communication apparatus are connected to each other, and the data communication apparatus executes data communication based on an instruction from the PC, transmission of an address disabled at the data communication apparatus side or an address for which an instruction of transmission from the PC is disabled to the user, and transmission of an address for which a disabled state is released at the data communication apparatus side or an address for which a disabled state of an instruction of transmission from the PC is released to the user.

According to one aspect, the present invention which achieves these objectives relates to a data communication system in which a data communication apparatus and an information processing terminal are connected to each other via an interface, and the data communication apparatus executes data communication in accordance with an instruction from the information processing terminal. The data communication apparatus includes identification means for identifying if data communication processing after automatic calling to an address instructed from the information processing terminal is appropriate, and means for transmitting, when the identification means has identified that the processing is inappropriate, information indicating the result of the identification to the information processing terminal. The information processing apparatus includes means for disabling an instruction of data communication to the address for the data communication apparatus based on the identification result information.

According to another aspect, the present invention which achieves these objectives relates to a method for controlling a data communication system in which a data communication apparatus and an information processing terminal are connected to each other via an interface, and the data communication apparatus executes data communication in accordance with an instruction from the information processing terminal. The data communication apparatus identifies if data communication processing after automatic calling to an address instructed from the information processing terminal is appropriate, and notifies, when it has been identified that the data communication processing is inappropriate, information indicating the result of the identification to the information processing terminal. The information processing apparatus disables an instruction of data communication to the address for the data communication apparatus based on the identification-result information.

According to still another aspect, the present invention which achieves these objectives relates to a data communication apparatus to which an external information processing terminal can be connected via an interface, and which executes data communication in accordance with an instruction from the information processing terminal. The data communication apparatus includes identification means for identifying if data communication processing after automatic calling to an address instructed from the information processing terminal is appropriate, and means for transmitting, when the identification means has identified that the processing is inappropriate, information indicating the result of the identification to the information processing terminal.

According to yet another object, the present invention which achieves these objectives relates to a storage medium storing a computer program executed by a computer of an information processing terminal which can be connected to a data communication apparatus via an interface, which transmits an instruction of data communication to the data communication apparatus via the interface, and which causes the data communication apparatus to perform data communication. The computer program includes processing of, when the data communication apparatus has identified that data communication processing after automatic calling to an address instructed from the information processing terminal is inappropriate, receiving information relating to the result of the identification transmitted from the data communication apparatus via the interface, and disabling an instruction of data communication to the address for the data communication apparatus based on the received identification-result information.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENTS

A first preferred embodiment of the present invention will now be described in detail with reference to the drawings.

In the first embodiment, a system including a PC and a facsimile apparatus will be described as a data communication system.

Figure 1:
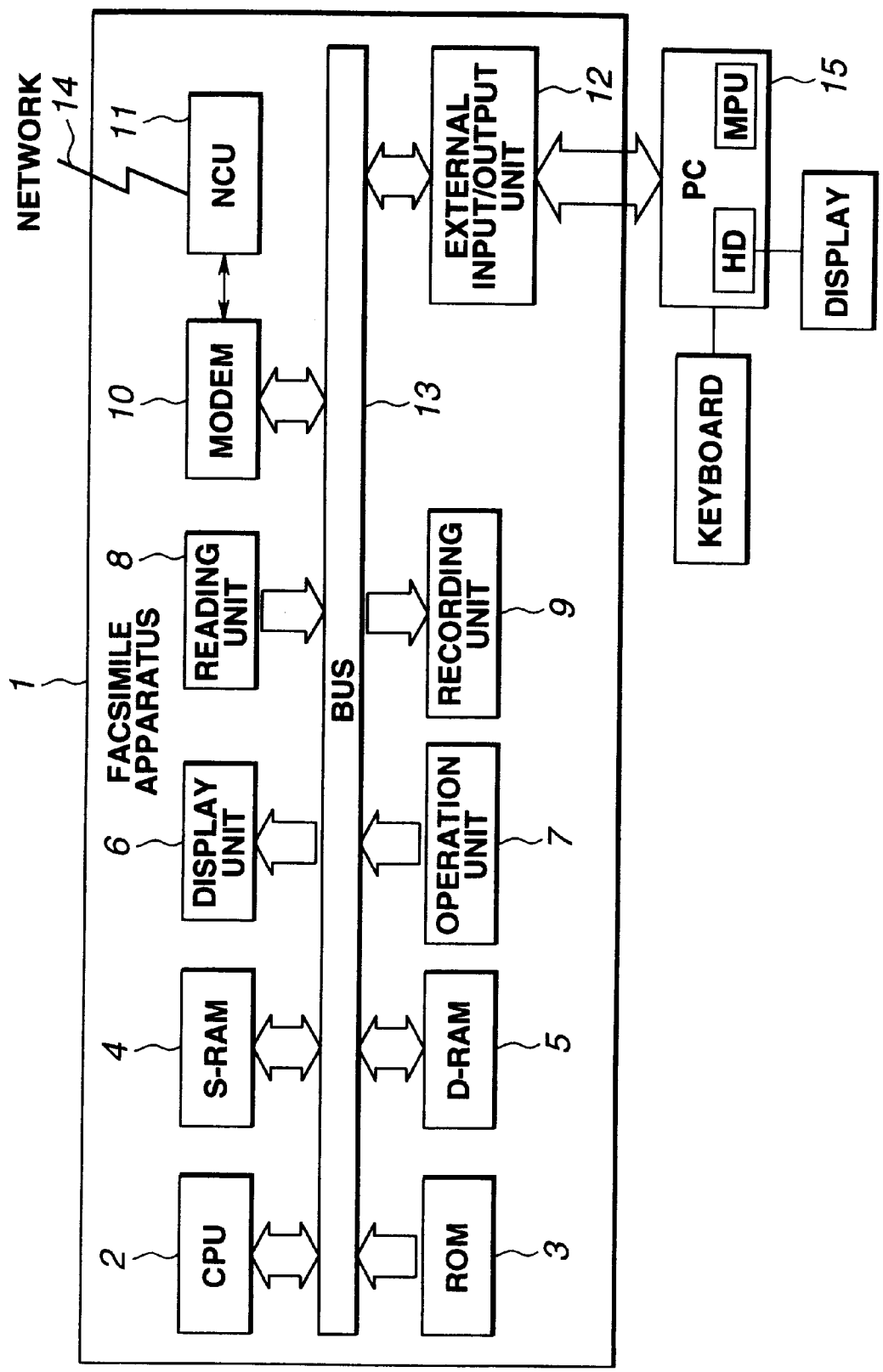
FIG. 1 is a block diagram illustrating the configuration of a facsimile apparatus according to a first embodiment of the present invention.

FIG. 1 is a block diagram illustrating the configuration of a facsimile apparatus according to the first embodiment.

In FIG. 1, a facsimile apparatus 1 includes a CPU (central processing unit) 2, an S-RAM (static random access memory) 4, a D-RAM (dynamic random access memory) 5, a display unit 6, an operation unit 7, a reading unit 8, a recording unit 9, a modem 10, an NCU (network control unit) 11, an external input/output unit 12, and a bus 13. The facsimile apparatus 1 is connected to a network 14 and to a PC 15.

The CPU 2, serving as a system control unit, is connected to the respective units via the bus 13 to control the entire facsimile apparatus. The ROM 13 stores control programs of the CPU 2, various kinds of initial values, and the like.

The S-RAM 4 is electrically backed up, and stores various kinds of set values, such as the name and the facsimile number of each communication partner, by the user, control data of the apparatus, and the like. The D-RAM 5 stores image data, and is also utilized as buffer storages for various kinds of works.

The display unit 6 comprises an LCD (liquid-crystal display), an LED (light-emitting diode) or the like, and notifies the user of various kinds of information, such the current time, the reading mode and the like. The operation unit 7 includes, for example, a ten-digit keypad for inputting a telephone number, one-touch dial keys and abbreviation dial keys capable of assigning a communication partner by a simpler operation than an ordinary telephone-number inputting operation using the ten-digit keypad by registering in advance telephone numbers or the like, and is used for receiving various kinds of inputs by the user, such as the telephone number of each communication partner, registration of data, and the like.

The reading unit 8 includes a contact-type image sensor (CS image sensor) for optically reading an original, an original-conveying mechanism, an image processing device, and the like, and optically reads an original to convert it into electrical image data, and generates high-definition image data by performing various kinds of correction processing.

The recording unit 9 includes an ink-jet or electrophotographic printer, and the like, and performs, for example, recording of received image data, recording of communication control information and various kinds of setting performed by the user, and printing of documents based on instructions from the PC 15.

The modem 10 performs modulation/demodulation of a facsimile procedure signal, modulation of image data stored in advance in the D-RAM 5 into a facsimile image signal, demodulation of a facsimile image signal into image data to be stored in the D-RAM 5, and the like. The NCU 11 controls connection/disconnection between the facsimile apparatus 1 and the network 14. The modem 10 and the NCU 11 are connected to each other, and participate in transmission/reception of a facsimile procedure signal and a facsimile image signal to/from a remote image communication apparatus.

The external input/output unit 12 includes an LSI (large-scale integrated circuit) for parallel input/output, and the like, and controls input of control commands between the facsimile apparatus 1 and the PC 15, and input/output of various kinds of parameters and data. The PC 15 includes a MPU (microprocessing unit), a hard disk, a keyboard, a display and the like. The MPU executes various kinds of processing based on application programs for exchanging data with the facsimile apparatus 1 which are installed in the hard disk.

Figure 2:
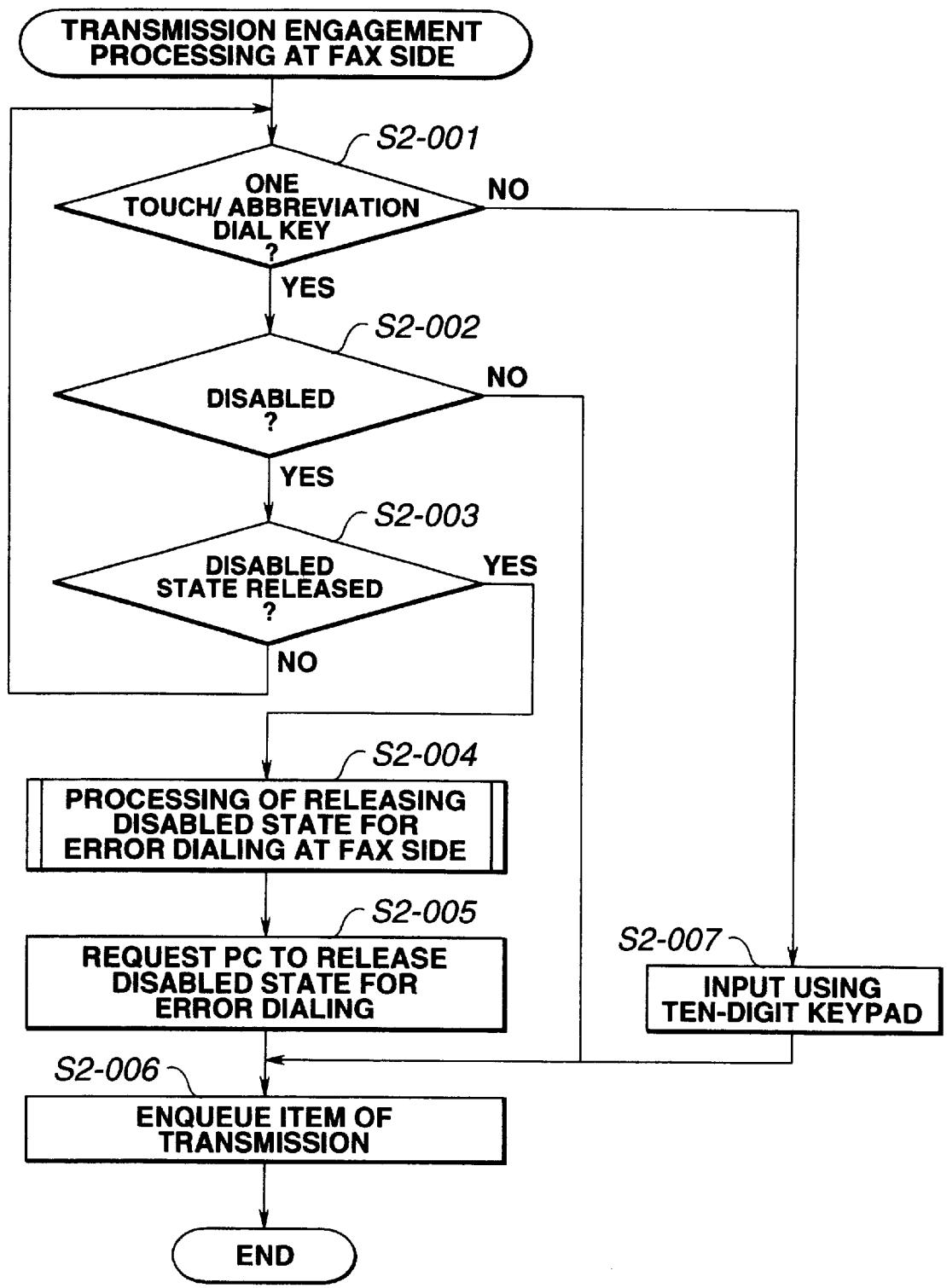
FIG. 2 is a flowchart illustrating an operation of engaging facsimile transmission in the first embodiment.

FIG. 2 is a flowchart illustrating processing of engaging facsimile transmission using the operation unit 7 of the facsimile apparatus 1 shown in FIG. 1 by the user. The processing shown in the flowchart is executed by the CPU 2 based on a control program stored in the ROM 3.

When the user depresses a key relating to dialing, such as a one-touch/abbreviation dial key, the ten-digit keypad or the like using the operation unit 7 shown in FIG. 1, transmission engagement processing shown in FIG. 2 is executed.

First, in step S2-001, it is determined if the depressed key is a one-touch/abbreviation dial key. If the result of the determination is affirmative, the process proceeds to step S2-002.

In step S2-002, it is determined if the depressed one-touch/abbreviation dial key is disabled based on a determination of error dialing. If the result of the determination in step S2-002 is affirmative, the process proceeds to step S2-003. If the result of the determination in step S2-002 is negative, the process proceeds to step S2-006. The detail of a method of determining error dialing will be described later.

In step S2-003, the user is notified of the fact that the one-touch/abbreviation dial key is disabled using the display unit 6, and is asked whether or not the disabled state is to be released. If the result of the determination in step S2-003 is affirmative, the process proceeds to step S2-004. If the result of the determination in step S2-003 is negative, the process returns to step S2-001, where display is provided on the display unit 6 to ask the user to reinput a communication partner.

In step S2-004, the disabled state of the one-touch/abbreviation dial key and the disabled state of other one-touch/abbreviation dial keys having the same telephone number as the disabled key are released based on a request to release the disabled state by the user's operation of the operation unit 7, and the process proceeds to step S2-005. The detail of this operation will be described later.

In step S2-005, in order to enable, i.e., release the disabled state, all possibly disabled addresses having the same telephone number as the concerned one-touch/abbreviation dial key in a telephone directory controlled by application software in the PC 15, information relating to the telephone number of the one-touch/abbreviation dial key is added as a parameter, and release of the disabled state of the concerned telephone number is requested to the PC 15.

Step S2-006 is executed when the determination in step S2-002 is negative, or when the processing of step S2-005 has been terminated, or when the processing of step S2-007 has been terminated. In step S2-006, an item of facsimile transmission is entered in transmission queue for performing scheduling, and the transmission engagement processing is terminated.

Step S2-007 is executed when the result of the determination in step S2-001 is negative. In step S2-007, the user is asked to input the telephone number of the communication partner for facsimile transmission using a key other than the one-touch/abbreviation dial key, such as the ten-digit keypad or the like. When a key indicating the completion of input of the telephone number of the communication partner has been depressed by the user, the process proceeds to step S2-006.

According to the above-described steps, facsimile transmission is engaged based on the user's instruction using the operation unit 7.

Figure 3:
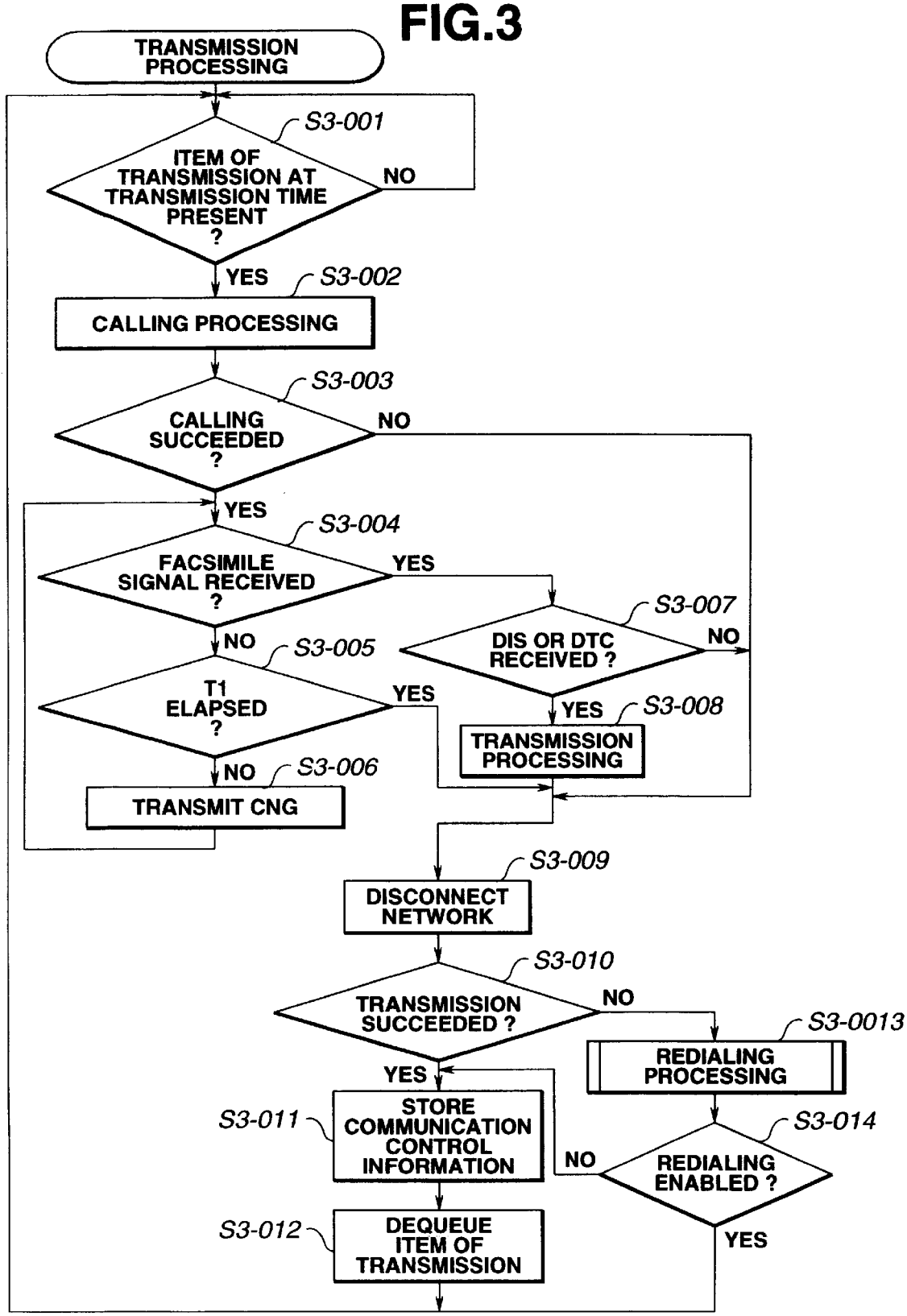
FIG. 3 is a flowchart illustrating the entire facsimile transmission processing in the first embodiment.

FIG. 3 is a flowchart illustrating the entire facsimile transmission processing, in which, for example, the facsimile apparatus performs facsimile transmission conforming to ITU-T (International Telecommunication Union-Telecommunication Standardization Sector) recommendation T.30 after peforming calling processing based on various kinds of data, such as the telephone number of the communication partner corresponding to the item of facsimile transmission entered in transmission queue, or the facsimile apparatus performs redialing processing when calling processing or facsimile transmission has not been normally performed. The processing shown in this flowchart is also executed by the CPU 2 based on a control program stored in the ROM 3.

First, in step S3-001, it is determined if the item of facsimile transmission entered in the transmission queue is at a calling time. If the result of the determination is affirmative, the process proceeds to step S3-002.

Usually, an item entered in transmission queue in the transmission engagement processing shown in FIG. 2 is immediately set to a caliting time. If the result of the determination in step S3-001 is negative, the step S3-001 is repeated until an item satisfying the condition is generated.

In step S3-002, in order to call the telephone number of the communication partner corresponding to the item entered in the transmission queue, the network 14 is closed by controlling the NCU 11. In an ordinary state, after closing the network 14, a dial tone (hereinafter abbreviated as "DT") signal is detected. Then, the telephone number of the assigned communication partner is called. After detecting a ringing (hereinafter termed "RBT") signal, the process proceeds to step S3-003 assuming that the calling is normally ended.

In step S3-003, it is determined if the calling has been normally ended in step S3-002. If the result of the determination in step S3-003 is affirmative, the process proceeds to step S3-004. If the result of the determination in step S3-003 is negative, i.e., if a DT signal has not been detected, or if a busy tone (hereinafter abbreviated as "BT") signal has been detected instead of an RBT signal, the process proceeds to step S3-009.

Processing from step S3-004 to step S3-008 executed when the result of the determination in step S3-003 is affirmative is based on procedures conforming to ITU-T recommendation T.30.

That is, in step S3-004, it is determined if a facsimile procedure signal has been received. If the result of the determination in step S3-004 is affirmative, the process proceeds to step S3-007. If the result of the determination in step S3-004 is negative, the process proceeds to step S3-005.

In step S3-005, it is determined if a time period T1 described in ITU-T recommendation T.30 has elapsed. If the result of the determination in step S3-005 is affirmative, the process proceeds to step S3-009. If the result of the determination in step S3-005 is negative, the process proceeds to step S3-006.

In step S3-006, a CNG (calling tone) signal of facsimile procedures is transmitted, and the process returns to step S3-004.

In step S3-007, it is determined if the received facsimile signal is one of a DIS (digital identification) signal and a DTC (digital transmission command) signal. If the result of the determination in step S3-007 is affirmative, the process proceeds to step S3-008. If the result of the determination in step S3-007 is negative, the process proceeds to step S3-009.

In step S3-008, image data is encoded based on ITU-T recommendation T.4, and the resultant data is transmitted to an image communication apparatus in communication. Upon termination of the transmission processing irrespective of the success thereof, the process proceeds to step S3-009.

In step S3-009, the network 14 is released by controlling the NCU 11, and the process proceeds to step S3-010.

In step S3-010, it is determined if the processing of step S3-008 has been executed and the transmission of the facsimile image has been normally ended. If the result of the determination in step S3-010 is affirmative, the process proceeds to step S3-011. If the result of the determination in step S3-010 is negative, the process proceeds to step S3-013.

In step S3-011, communication control information, including the start time, the communication time period, the telephone number and the abbreviation of the communication partner, the number of communication operations, the success or failure of transmission, and the like, is stored in the S-RAM 4 based on the result of the transmission.

Then, in step S3-012, the concerned item entered in the transmission queue is deleted from the transmission queue to complete the current transmission processing, and the process returns to step S3-001.

In step S3-013 which is executed when the result of the determination in step S3-010 is negative, redialing processing of the concerned item of transmission is executed. The detail of this processing will be described later.

In step S3-014, it is determined if redialing of the concerned item of transmission has been enabled in the redialing processing of step S3-013. If the result of the determination in step S3-014 is affirmative, the process returns to step S3-001. If the result of the determination in step S3-014 is negative, the processing of step S3-011 is executed.

According to the above-described steps, the processing of transmission of the item of facsimile transmission entered in the transmission queue is executed.

Figure 4:
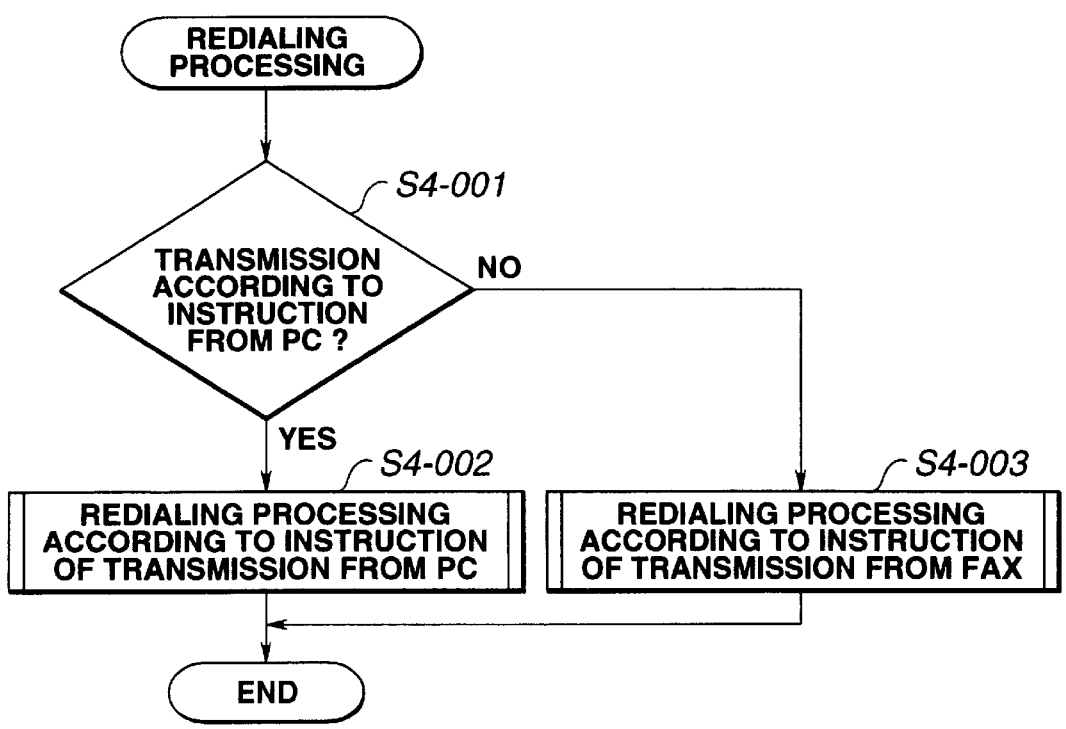
FIG. 4 is a flowchart illustrating the detail of subroutine processing relating to redialing in the first embodiment.

FIG. 4 is a flowchart illustrating the detail of subroutine processing relating to redialing performed in step S3-013 shown in FIG. 3.

First, in step S4-001, it is determined whether transmission is to be performed according to an instruction from the PC or according to a instruction from the facsimile apparatus. In the case of transmission according to an instruction from the PC, the process proceeds to step S4-002. In the case of transmission according to an instruction from the facsimile apparatus, the process proceeds to step S4-003. The detail of the processing of step S4-002 is shown in FIG. 5, and the detail of the processing of step S4-003 is shown in FIG. 6.

Figure 5:
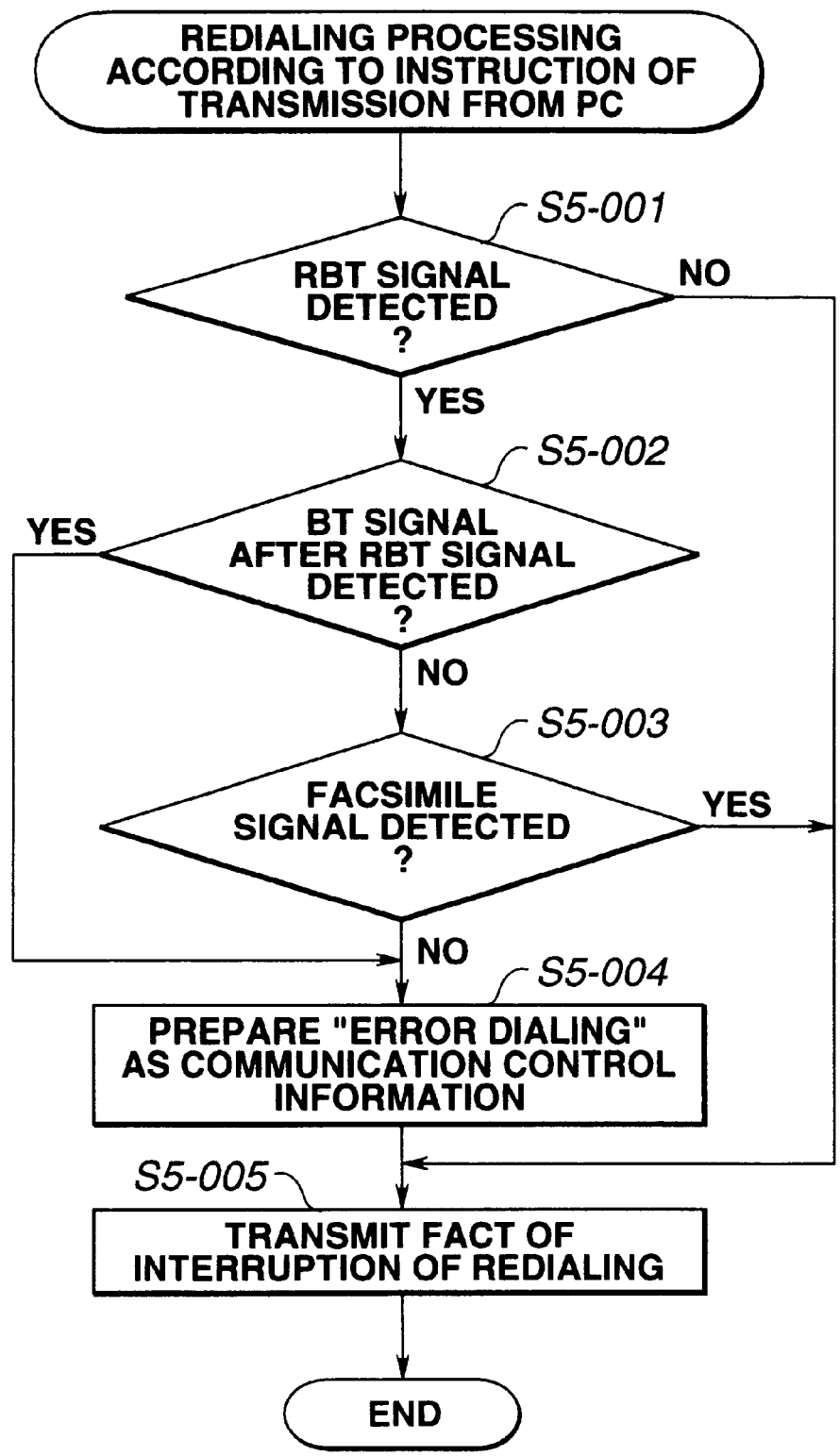
FIG. 5 is a flowchart illustrating the detail of redialing processing according to an instruction of transmission from a PC in the first embodiment.
Figure 6:
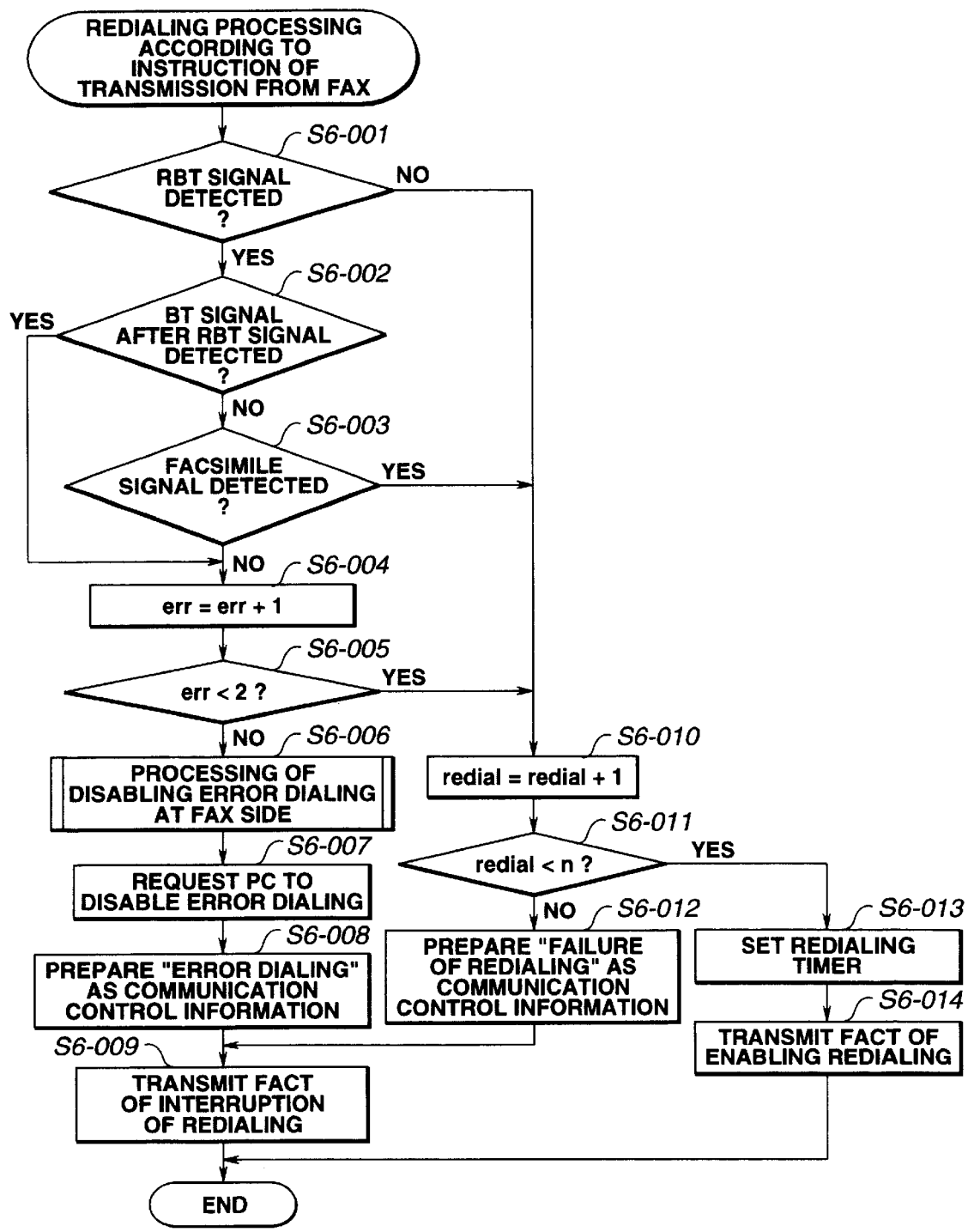
FIG. 6 is a flowchart illustrating the detail of redialing processing by a transmission operation of the main body of the facsimile apparatus in the first embodiment.

FIG. 5 is a flowchart illustrating the detail of subroutine processing relating to the redialing processing according to an instruction from the PC performed in step S4-002 shown in FIG. 4.

First, in step S5-001, it is determined if an RBT signal has been detected during the calling processing in step S3-002 shown in FIG. 3. If the result of the determination in step S5-001 is affirmative, the process proceeds to step S5-002. If the result of the determination in step S5-001 is negative, the process proceeds to step S5-005.

In step S5-002, it is determined if a BT signal has been detected after the RBT signal, i.e., if a BT signal has been detected during the loop processing from step S3-004 to step S3-006 shown in FIG. 3. If the result of the determination in step S5-002 is affirmative, the process proceeds to step S5-004. If the result of the determination in step S5-002 is negative, the process proceeds to step S5-003.

In step S5-003, it is determined if a facsimile procedure signal has been received during the loop processing from step S3-004 to step S3-006 shown in FIG. 3. If the result of the determination in step S5-003 is affirmative, i.e., when the processing of step S3-007 shown in FIG. 3 has been executed, the process proceeds to step S5-005. If the time period T1 has elapsed before receiving a facsimile procedure signal, the process proceeds to step S5-004.

In step S5-004, data indicating "error dialing" is prepared as communication control information to be utilized in step S3-001 shown in FIG. 3, and the process proceeds to step S5-005.

In step S5-005, the fact that redialing of the item of transmission is interrupted in subroutine processing of redialing is transmitted to the calling side, and the redialing processing is terminated.

According to the above-described steps, subroutine processing of determining error dialing and redialing for each item of transmission instructed from the PC is executed.

FIG. 6 is a flowchart illustrating the detail of subroutine processing relating to the redialing processing according to an instruction of transmission from the facsimile apparatus in step S4-003 shown in FIG. 4.

First, in step S6-001, it is determined if an RBT signal has been detected during the calling processing of step S3-002 shown in FIG. 3. If the result of the determination in step S6-001 is affirmative, the process proceeds to step S6-002. If the result of the determination in step S6-001 is negative, the process proceeds to step S6-010.

In step S6-002, it is determined if a BT signal has been detected after an RBT signal, i.e., if a BT signal has been detected during the loop processing from step S3-004 to step S3-006 shown in FIG. 3. If the result of the determination in step S6-002 is affirmative, the process proceeds to step S6-004. If the result of the determination in step S6-002 is negative, the process proceeds to step S6-003.

In step S6-003, it is determined if a facsimile procedure signal has been received during the loop processing from step S3-004 to step S3-006 shown in FIG. 3. If the result of the determination in step S6-003 is affirmative, i.e., if the processing of step S3-007 shown in FIG. 3 has been executed, the process proceeds to step S6-010. If the time period Ti has elapsed before receiving a facsimile procedure signal, the process proceeds to step S6-004.

In step S6-004, the value of a counter for counting the number "err" of error dialing operations prepared in a state of being initialized to 0 for each item of transmission is incremented by one, and the process proceeds to step S6-005.

In step S6-005, it is determined if the value "err" of the error-dialing counter is less than 2. If the result of the determination in step S6-005 is affirmative, the process proceeds to step S6-010. If the result of the determination in step S6-005 is negative, the process proceeds to step S6-006.

In step S6-006, processing of comparing the telephone number to be subjected to redialing processing with the telephone numbers of all communication partners registered in one touch/abbreviation dial keys, and disabling, if the same telephone number is registered in a one touch/abbreviation dial, that one touch/abbreviation dial key is executed. The detail of this processing will be described later.

In step S6-007, in order to disable all addresses having the same telephone number as the concerned item of transmission in the telephone directory controlled by the application software in the PC 15, information relating to the telephone number of the item of transmission is added as a parameter to request the PC 15 to disable that telephone number, and the process proceeds to step S6-008.

In step S6-008, data indicating "error dialing" is prepared as communication control information to be utilized in step S3-011 shown in FIG. 3, and the process proceeds to step S6-009.

In step S6-009, the fact that redialing of the concerned item of transmission is interrupted in the subroutine processing of redialing is transmitted to the calling side, to terminate the redialing processing.

The processing of step S6-010 is executed when the result of the determination in step S6-001 is negative, or when the result of the determination in step S6-003 is affirmative, or when the result of the determination in step S6-005 is affirmative. In step S6-010, the value "redial" of a counter for counting the number of redialing operations prepared in a state of being initialized to 0 for each item of transmission is incremented by one, and the process proceeds to step S6-011.

In step S6-011, it is determined if the value "redial" of the redialing-number counter is less than a predetermined value n. If the result of the determination in step S6-011 is affirmative, the process proceeds to step S6-013. If the result of the determination in step S6-011 is negative, the process proceeds to step S6-012.

In step S6-012, data indicating "failure of redialing" is prepared as communication control information to be utilized in step S3-011 shown in FIG. 3, and the process proceeds to step S6-009, and the redialing processing is terminated.

In step S6-013, the calling time of the concerned item of transmission referred in step S3-011 shown in FIG. 3 is set to a predetermined value of a redialing timer, and the process proceeds to step S6-014.

In step S6-014, the fact that the redialing of the concerned item of transmission has been enabled in the subroutine processing of redialing is transmitted to the calling side, and the redialing processing is terminated.

According to the above-described steps, the subroutine processing of determining error dialing and redialing for each item of transmission is executed.

Figure 7:
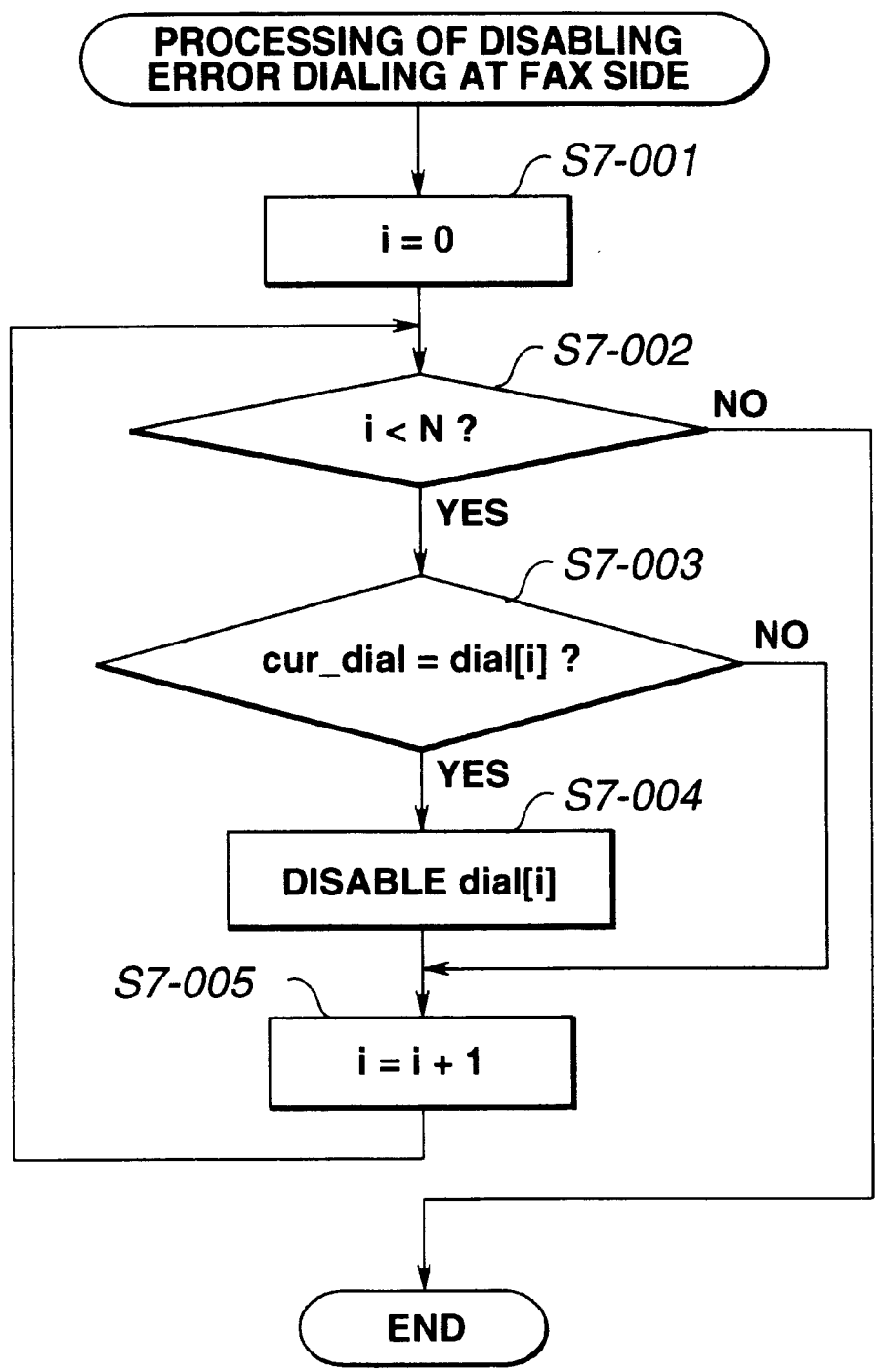
FIG. 7 is a flowchart illustrating the detail of subroutine processing of disabling a one-touch/abbreviation dial key on the main body of the facsimile apparatus in the first embodiment.

FIG. 7 is a flowchart illustrating the detail of subroutine processing for disabling a one-touch/abbreviation dial key where the same telephone number as the telephone number of the item of transmission determined as error dialing is registered which is described in step S6-006 shown in FIG. 6.

In the facsimile apparatus of the first embodiment, L addresses can be assigned using one-touch dial keys, and M addresses can be assigned using abbreviation dial keys. N=L+M registered data in total have been sequentially stored in the S-RAM 4.

First, in step S7-001, index i for sequentially accessing the registered data is initialized to 0, and loop processing in and after step S7-002 is executed.

In step S7-002, it is determined of index i is less than the total number N of the sequentially registered data. If the result of the determination in step S7-002 is affirmative, the process proceeds to step S7-003. If the result of the determination in step S7-002 is negative, the processing of disabling error dialing is terminated.

In step S7-003, it is determined if the telephone number cur_dial of the item of transmission determined to be error dialing equals the telephone number dial[i] stored at the i-th position of the registered data. At that time, comparison is performed by removing null symbols which are not transmitted to the network at calling, and special characters, such parentheses, underlines and the like. If the result of the determination in step S7-003 is affirmative, the process proceeds to step S7-004. If the result of the determination in step S7-003 is negative, the process proceeds to step S7-005.

In step S7-004, in order to disable the one-touch/ abbreviation dial key where the same telephone number as the telephone number of the item of transmission determined to be error dialing is registered, a value indicating a disabled state is set in an attribute region for the i-th registered data, and the process proceeds to step S7-005.

In step S7-005, index i is incremented by one, and the process returns to step S7-002 to repeat the loop processing.

According to the above-described steps, the error-dialing disabling subroutine processing of disabling a one-touch/ abbreviation dial key where the same telephone number as the telephone number of the item of transmission determinend to be error dialing is registered is executed.

Figure 8:
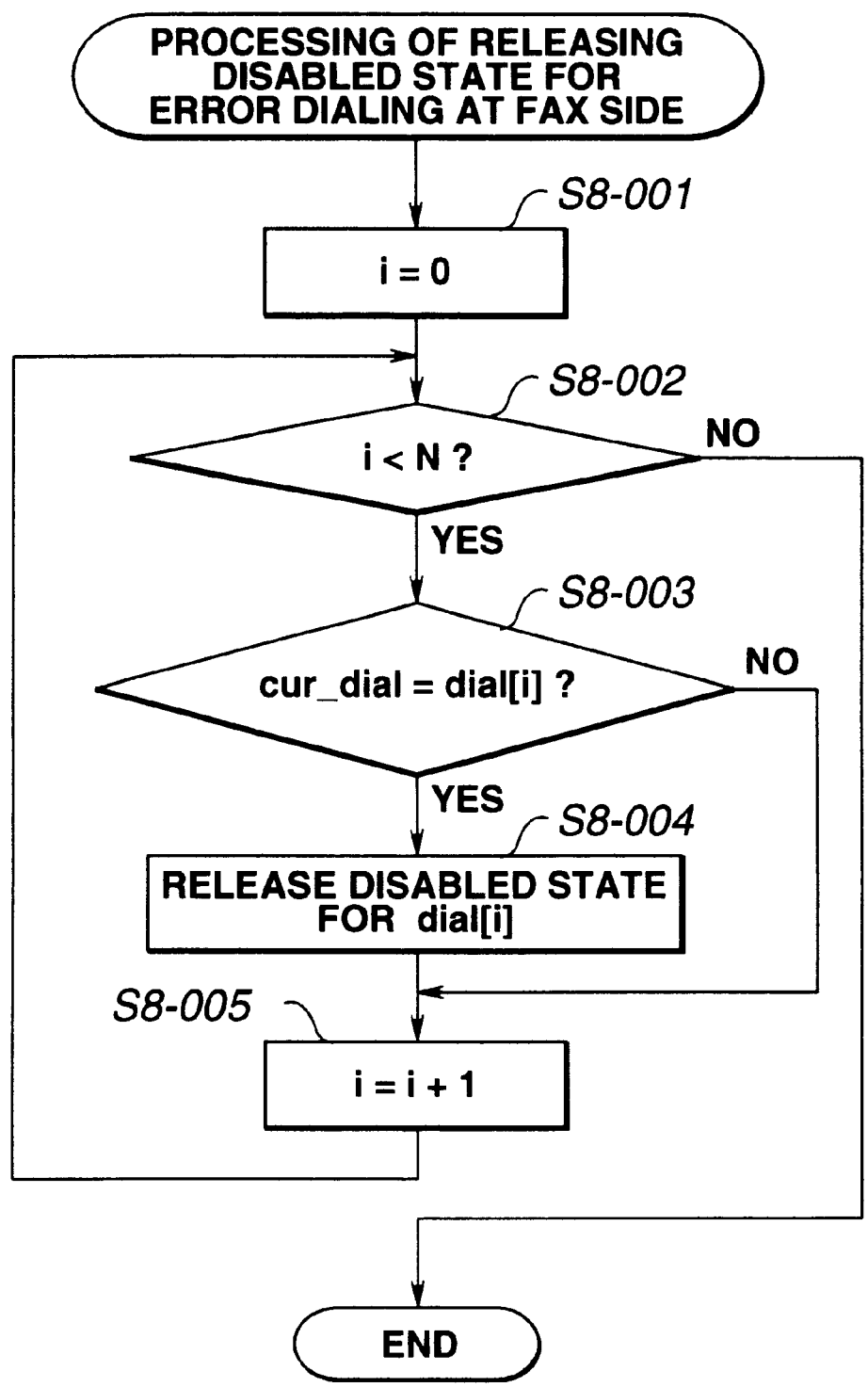
FIG. 8 is a flowchart illustrating the detail of subroutine processing of releasing a disabled state of a one-touch/abbreviation dial key on the main body of the facsimile apparatus in the first embodiment.

FIG. 8 is a flowchart illustrating the detail of subroutine processing of releasing a disabled state of the disabled one touch/abbreviation dial key and other one-touch/abberiation dial keys having the same telephone number as that of the disabled key, described in step S2-004 shown in FIG. 2.

First, in step S8-001, index i for sequentially accessing the registered data is initialized to 0, and loop processing in and after step S8-002 is executed.

In step S8-002, it is determined if index i is less than the total number N of the sequentially registered data. If the result of the determination in step S8-002 is affirmative, the process proceeds to step S8-003. If the result of the determination in step S8-002 is negative, the processing of releasing the disabled state of error dialing is terminated.

In step S8-003, it is determined if the telephone number cur_dial for which the user requested to release the disabled state equals the telephone number dial[i] stored at the i-th position of the registered data. At that time, comparison is performed by removing null symbols which are not actually transmitted to the network at calling, and special characters, such parentheses, underlines and the like. If the result of the determination in step S8-003 is affirmative, the process proceeds to step S8-004. If the result of the determination in step S8-003 is negative, the process proceeds to step S8-005.

In step S8-004, in order to release the disabled state of the one-touch/abbreviation dial key where the same telephone number as the telephone number for which the user asked to release the disabled state is registered, a value indicating a state other than a disabled state is set in an attribute region for the i-th registered data, and the process proceeds to step S8-005.

In step S8-005, index i is incremented by one, and the process returns to step S8-002 to repeat the loop processing.

According to the above-described steps, the subroutine processing for releasing a disabled state of error dialing, in which the disabled state of a one-touch/abbreviation dial key where the same telephone number as the telephone number for which the user asked to release the disabled state is registered is released, is executed.

Figure 9:
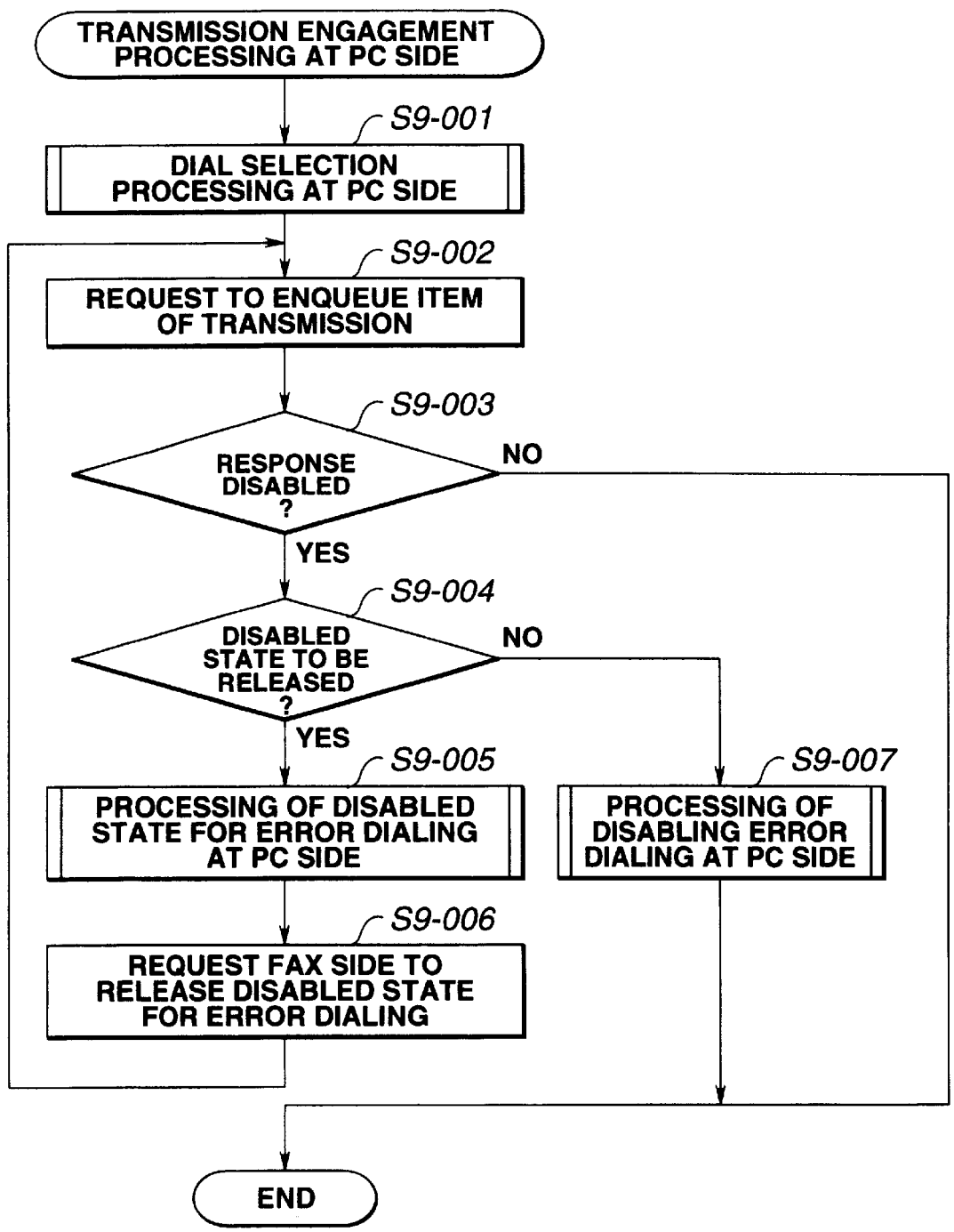
FIG. 9 is a flowchart illustrating the operation of software in the PC when the user engages facsimile transmission using the PC in the first embodiment.

FIG. 9 is a flowchart illustrating the operation of software in the PC when the user engages facsimile transmission using the PC 15.in the system of the first embodiment. The processing of this flowchart is executed by the MPU based on an application program installed in the hard disk of the PC 15.

When the user has selected an item of facsimile transmission from a menu using the keyboard or a pointing device connected to the PC 15 using the software in the PC 15, transmission engagement processing at the PC side shown in FIG. 9 is executed.

Figure 15:
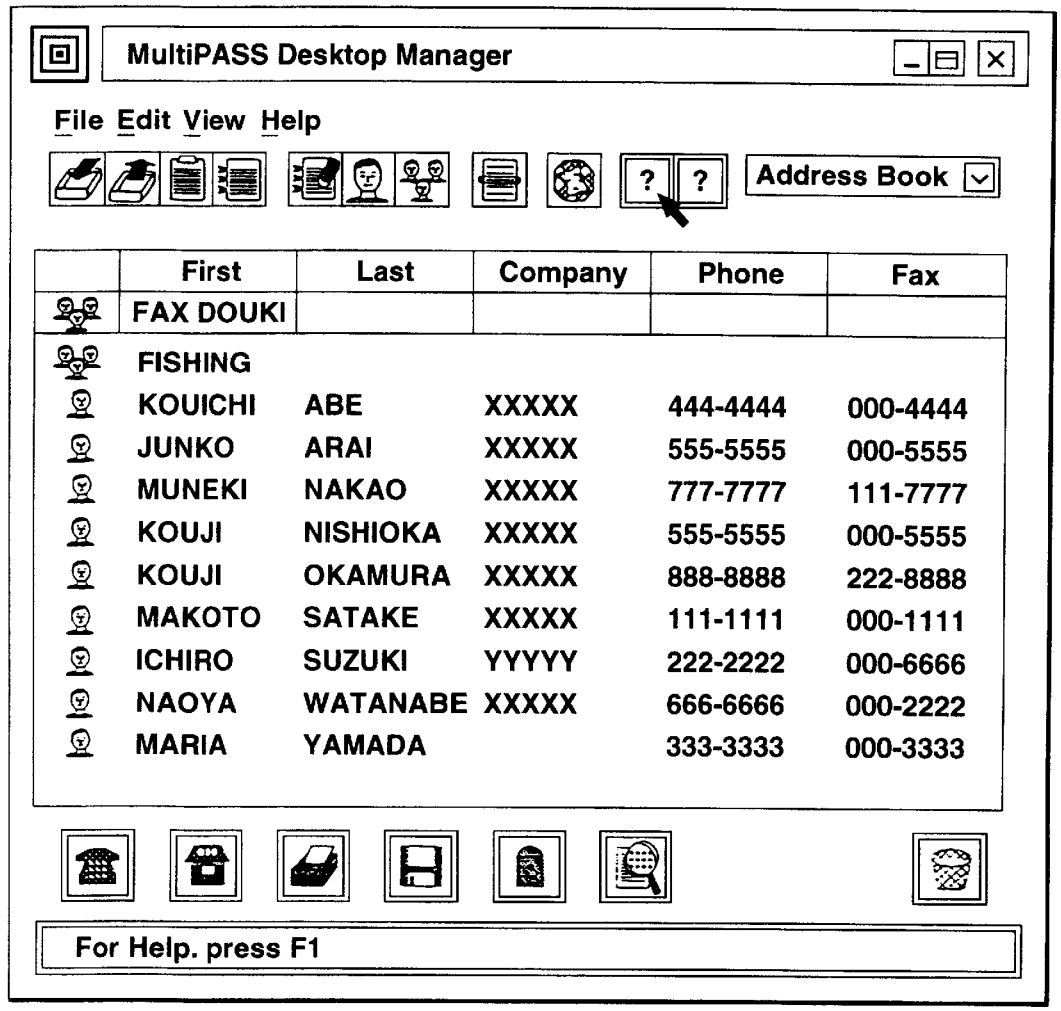
FIG. 15 is a diagram illustrating an example of display on a dial input dialog box used in the first embodiment.
Figure 16:
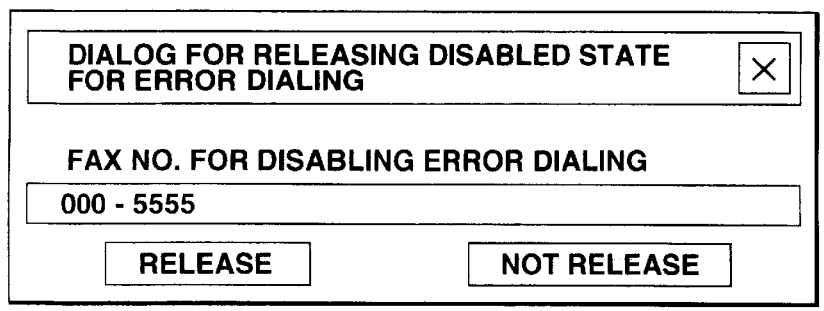
FIG. 16 is a diagram illustrating an example of display on a dialog box for releasing a disabled state used in the first embodiment.

FIGS. 15 and 16 are diagrams illustrating dialog boxes on the display picture surface of the PC 15 used in this transmission engagement processing.

The display shown in FIG. 15 illustrates a dial input dialog box for displaying the contents of a telephone directory registered in advance in the PC 15, and shows various kinds of information, such as the (first/last) name, the name of the company, the telephone number and the facsimile number of each communication partner.

The display shown in FIG. 16 illustrates a disabled-state releasing dialog box for selecting release of the disabled state of a disabled dial. This display shows the facsimile number determined to be error dialing, and panels for selecting whether or not the disabled state is to be released. This disabled-state releasing dialog box is subjected to automatic pop-up display on the display picture surface of the PC 15 when the disabled facsimile number has been selected.

Engagement of transmission for a communication partner is performed according to the following procedures using such two dialog boxes.

Returning to FIG. 9, first, in step S9-001, in order to urge the user to input the telephone number of the communication partner for facsimile transmission, the dial input dialog box shown in FIG. 15 is displayed. A so-called telephone directory is provided in software of the PC side instead of one-touch/abbreviation dial keys of the facsimile apparatus. The user can assign the telephone number of the communication parter for facsimile transmission by selecting the communication partner registered in the telephone directory or by directly inputting the telephone number, using the dial input dialog box shown in FIG. 15.

In step S9-001, dial selection processing based on the user's input using the dial input dialog box is performed, and the process proceeds to step S9-002. The detail of this processing will be described later.

In step S9-002, in order to immediately enter the item of facsimile transmission based on the user's dial selection in transmission-item queue provided in the facsimile apparatus, a request to enter the concerned item of transmission in the queue is transmitted from the software of the PC side to the facsimile apparatus via the external input/ output unit 12.

Processing at the facsimile apparatus side for the request to enter the item of transmission in the queue from the PC, i.e., processing of accepting transmission engagement from the PC in the facsimile apparatus, will be described later.

Then, processing from step S9-003 to step S9-007 is appropriately executed. This processing is executed when synchronism between the disabled states of respective dial keys controlled by the facsimile apparatus 1 and the disabled states of respective communication partners in the telephone directory controlled by the PC 15 is broken because of disconnection of connection between the facsimile apparatus 1 and the PC 15 by some reason, in order to restore the synchronism between the disabled states in the fascimile apparatus 1 and the PC 15.

In step S9-003, it is determined if the contents of a response of the facsimile apparatus for the request to enter the item of transmission in the queue at the facsimile apparatus side performed in step S9-002 indicate a disabled state. If the result of the determination in step S9-003 is affirmative, i.e., if the response of the facsimile apparatus for the request of entering indicates that "the telephone number of the communication partner corresponding to the requested item of transmission is in a disabled state in the facsimile apparatus", the process proceeds to step S9-004. If the result of the determination in step S9-003 is negative, the transmission engagement processing at the PC side is terminated.

In step S9-004, in response to the result of the determination in step S9-003, in order to ask the user whether or not the disabled state of the one-touch/abbreviation dial key of the facsimile apparatus side where the same telephone number as the telephone number of the item of transmission is registered is to be released, the disabled-state notifying dialog box shown in FIG. 16 is displayed, and the user determines whether or not the release of the disabled state of the concerned dial key is to be selected. If the result of the determination in step S9-004 is affirmative, the process proceeds to step S9-005. If the result of the determination in step S9-004 is negative, the process proceeds to step S9-007.

In step S9-005, in response to the user's request to release the disabled state performed in step S9-004, the disabled state of the communication partner in the telephone directory at the PC side controlled at the PC side is released, and the process proceeds to step S9-006. The detail of this processing will be described later.

In step S9-006, in response to the user's request to release the disabled state performed in step S9-004, in order to release the disabled state of the one-touch/abbreviation dial key at the facsimile apparatus side, a request to release the disabled state of the one-touch/abbreviation dial where the same telephone number as the telephone number of the concerned item of transmission is registered is transmitted from the software at the PC side to the facsimile apparatus via the external input/output unit 12. In response to this request, the facsimile apparatus executes the processing of releasing the disabled state of error dialing shown in FIG. 8. Then, the process returns to step S9-002, and a request to enter the concerned item of transmission in the queue at the facsimile apparatus side is again transmitted.

In step S9-007, in response to the user's selection to admit the disabled state performed in step S9-004, the communication partner in the telephone directory at the PC side where the same telephone number as the telephone number of the concerned item of transmission is registered is disabled, and the transmission engagement processing at the PC side is terminated. The detail of this processing will be described later.

According to the above-described steps, the transmission engagement processing at the PC side is executed.

Figure 10:
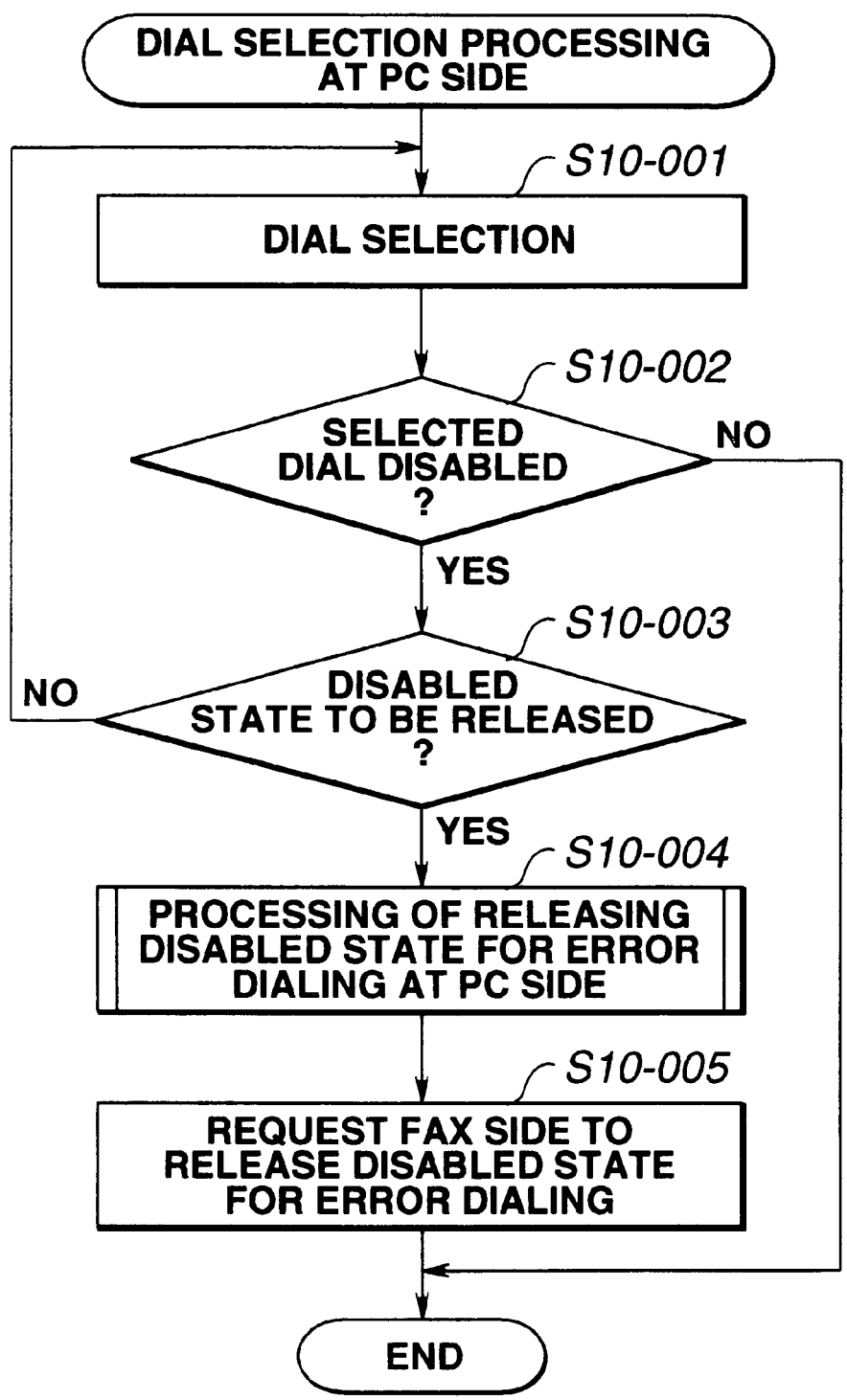
FIG. 10 is a flowchart illustrating the detail of subroutine processing of dial selection at the PC side in the first embodiment.

FIG. 10 is a flowchart illustrating the detail of subroutine processing of dial selection at the PC side described in step S9-001 shown in FIG. 9.

As described above, the so-called telephone directory is provided in the software of the PC side instead of one-touch/abbreviation dial keys of the facsimile apparatus.

First, in step S10-001, the user instructs completion of dial selection by selecting an arbitrary communication partner registered in the telephone directory or directly inputting the telephone number, using the dial input dialog box displayed in order to assign the telephone number of the communication partner of facsimile transmission.

The processing of step S10-002 is executed in response to the instruction to complete dial selection performed in step S10-001. In step S10-002, it is determined if the communication partner selected in step S10-001 is disabled. If the result of the determination in step S10-002 is affirmative, the process proceeds to step S10-003. If the result of the determination in step S10-002 is negative, the dial selection processing at the PC side is terminated.

In step S10-003, in response to the result of the determination in step S10-002, the disabled-state releasing dialog box shown in FIG. 16 is displayed as in step S9-004, and the user determines whether or not release of the disabled state of the communication partner is to be selected. If the result of the determination in step S10-003 is affirmative, the process proceeds to step S10-004. If the result of the determination in step S10-003 is negative, the process returns to step S10-001, where the user is asked to again perform dial selection.

In step S10-004, in response to the user's request to release the disabled state provided in step S10-003, the disabled state of the communication partner in the telephone directory at the PC side controlled at the PC side is released, and the process proceeds to step S10-005. The detail of this processing will be described later.

In step S10-005, in order to release the disabled state of the one-touch/abbreviation dial key at the facsimile apparatus side in response to the user's request to release the disabled state provided in step S10-003, a request to release the disabled state of the one-touch/abbreviation dial key where the same telephone number as the telephone number of the selected communication partner is registered is transmitted from the software at the PC side to the facsimile apparatus via the external input/output unit 12, to terminate the dial selection processing at the PC side.

According to the above-described steps, the dial selection processing at the PC side is executed.

Figure 11:
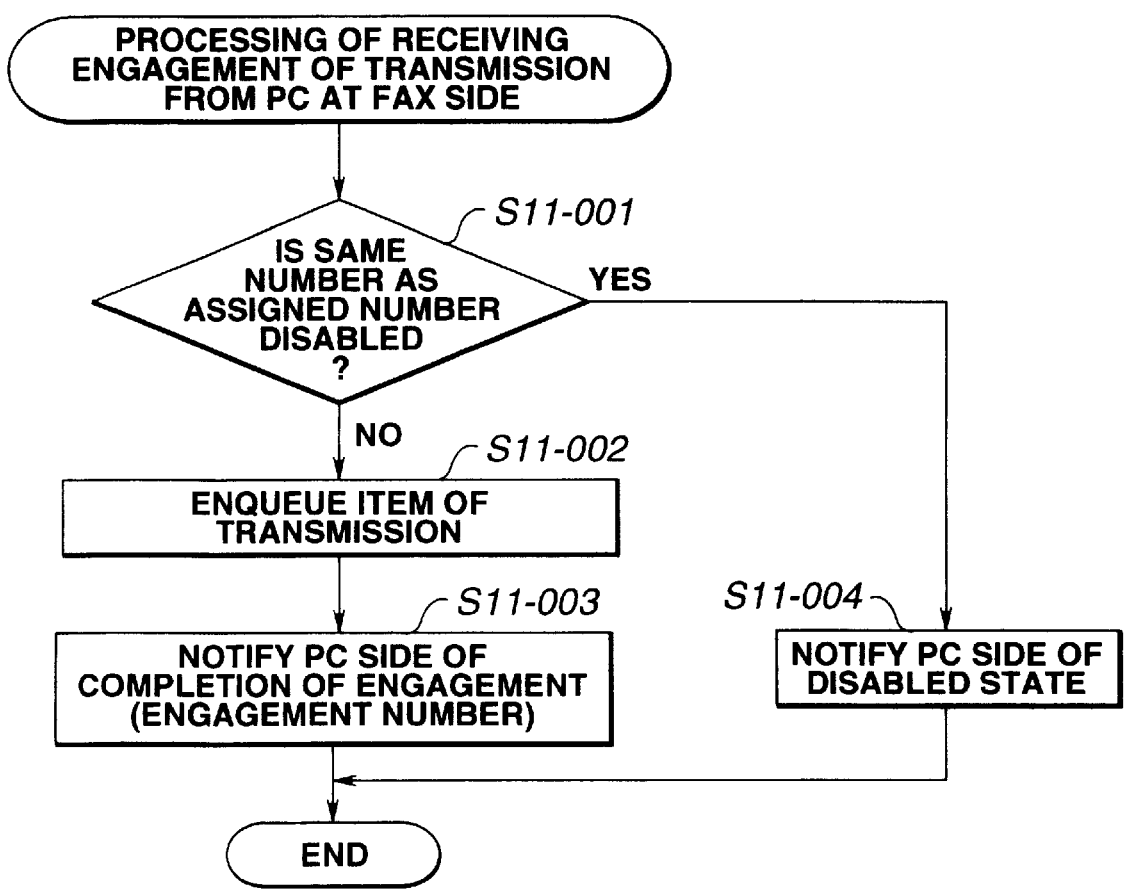
FIG. 11 is a flowchart illustrating the detail of processing of receiving engagement of transmission from the PC in the facsimile apparatus of the first embodiment.

FIG. 11 is a flowchart illustrating the detail of processing of entering an item of transmission in transmission queue based on an instruction of the PC executed in the facsimile apparatus, in response to a request to enter the item of transmission in the transmission queue from the PC to the facsimile apparatus executed in step S9-002 shown in FIG. 9, i.e., processing of receiving engagement of transmission from the PC in the facsimile apparatus.

First, in step S11-001, it is determined if the one-touch/abbreviation dial key where the same telephone number as the telephone number corresponding to the item of transmission requested to be entered in the transmission queue is disabled. If the result of the determination in step S11-001 is negative, the process proceeds to step S11-002, where the item of transmission requested to be entered is entered in the transmission queue. Then, in step S11-003, completion of engagement is notified to the PC 15 together with an engagement number as a response to the request, and the processing of receiving engagement of transmission from the PC 15 is terminated.

If the result of the determination in step S11-001 is affirmative, the process proceeds to step S11-004, where the fact of the disabled state is notified as a response to the request, and the processing of receiving engagement of transmission from the PC is terminated.

According to the above-described steps, the processing of receiving engagement of transmission from the PC in the facsimile apparatus is executed.

Figure 12:
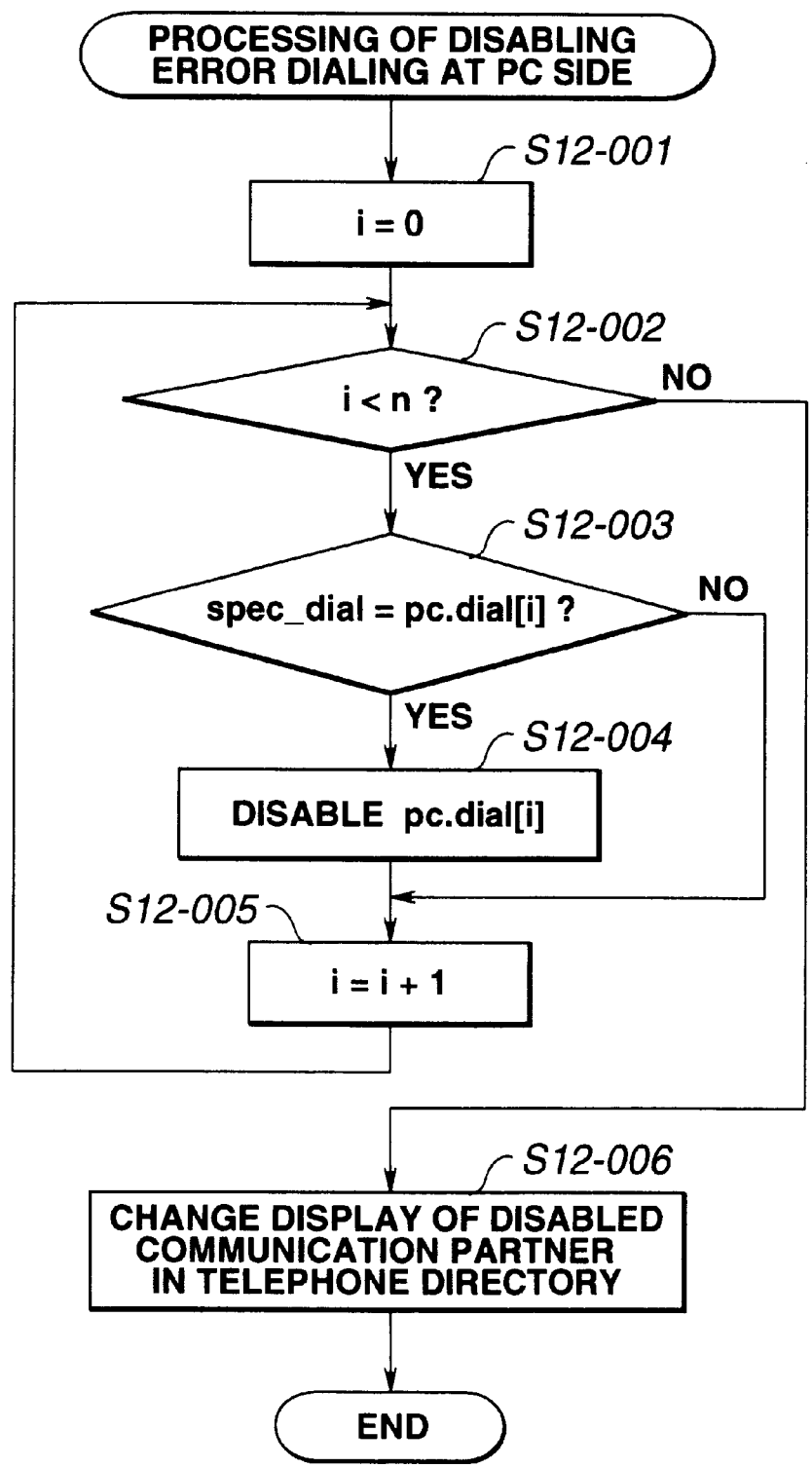
FIG. 12 is a flowchart illustrating the detail of subroutine processing of disabling a communication partner in a telephone directory at the PC side in the first embodiment.
Figure 14:
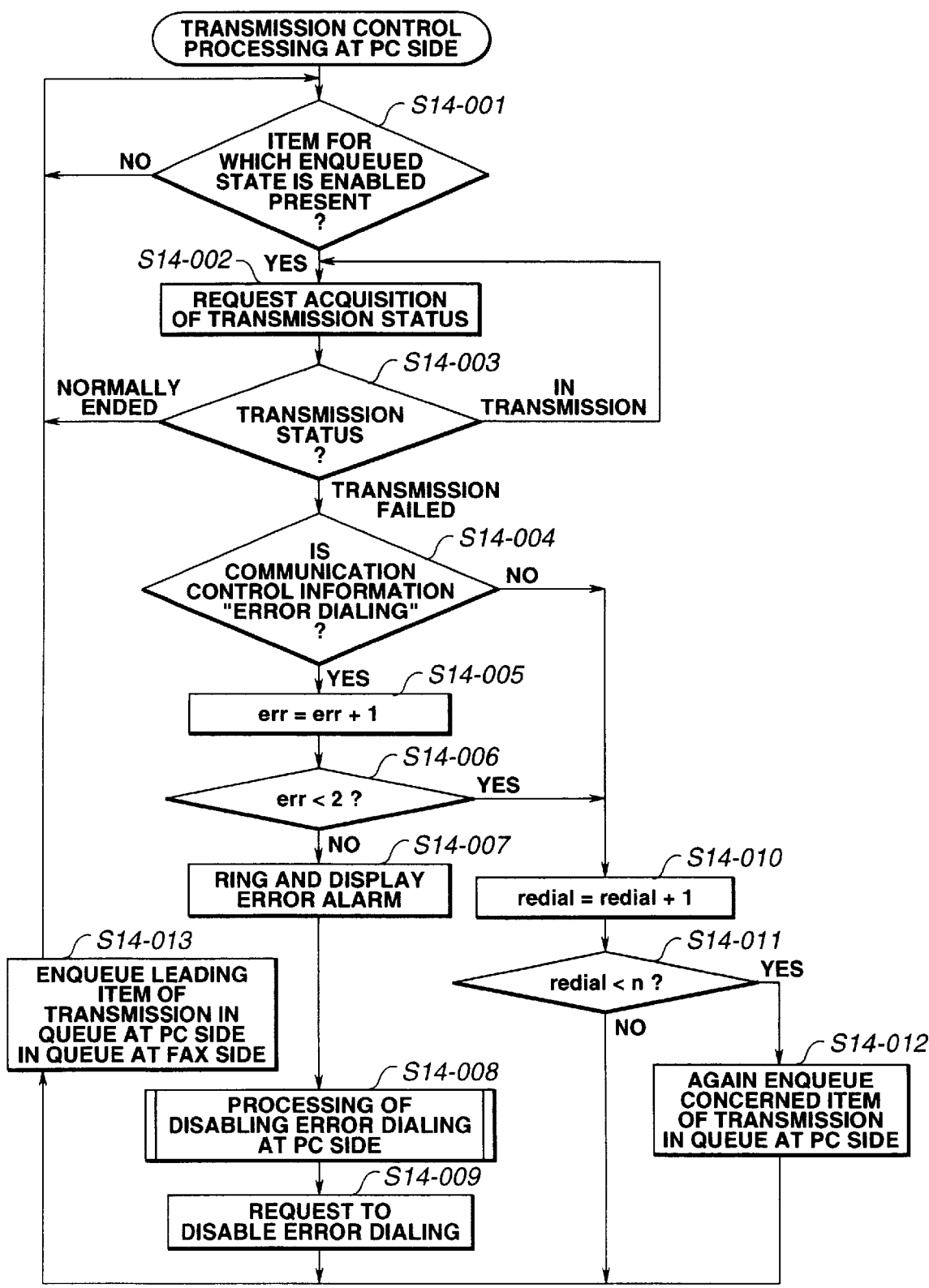
FIG. 14 is a flowchart illustrating processing for controlling the status of an item of transmission based on an instruction from the PC entered in transmission queue at the facsimile side according to transmission engagement processing at the PC side in the first embodiment.

FIG. 12 is a flowchart illustrating the detail of subroutine processing described in step S9-007 shown in FIG. 9, and step S14-007 shown in FIG. 14, i.e., processing of disabling the communication partner in the telephone directory at the PC side where the same telephone number as the telephone number assigned in these steps is registered because a disabled state is provided due to error dialing, or because of determination as error dialing.

The telephone directory in the PC 15 in the first embodiment is sequentially controlled by the software in the PC 15 so as to be able to access information relating to each communication partner with an index number. The number of registered communication partners at present is assumed to be n.

First, in step S12-001, index i for sequentially accessing each registered communication partner which is sequentially controlled is initialized to 0, and loop processing in and after step S12-002 is executed.

In step S12-002, it is determined if index i is less than the number n of registered communication partners at present which are sequentially controlled. If the result of the determination in step S12-002 is affirmative, the process proceeds to step S12-003. If the result of the determination in step S12-002 is negative, the process proceeds to step S12-006.

In step S12-003, it is determined if the assigned telephone number spec_dial equals the telephone number pc.dial[i] of the i-th registered communication partner. At that time, as in the processing of disabling error dialing in the facsimile apparatus, comparison is performed by removing null symbols which are not actually transmitted to the network at calling, and special characters, such as parentheses, underlines and the like. If the result of the determination in step S12-003 is affirmative, the process proceeds to step S12-004. If the result of the determination in step S12-003 is negative, the process proceeds to step S12-005.

In step S12-004, in order to disable the communication partner in the telephone directory where the same telephone number as the assigned telephone number is registered, a value indicating a disabled state is set in an attribute region corresponding to the i-th registered communication partner, and the process proceeds to step S12-005.

In step S12-005, index i is incremented by one, and the process returns to step S12-002 to repeat the loop processing.

In step S12-006, the value indicating the disabled state is detected in the attribute region corresponding to the registered communication partner set in step S12-004, and all disabled communication partners from among communication partners in the dial input dialog box (telephone directory) shown in FIG. 15 are displayed by being discriminated from other communication partners, for example, according to dimmer display.

Figure 17:
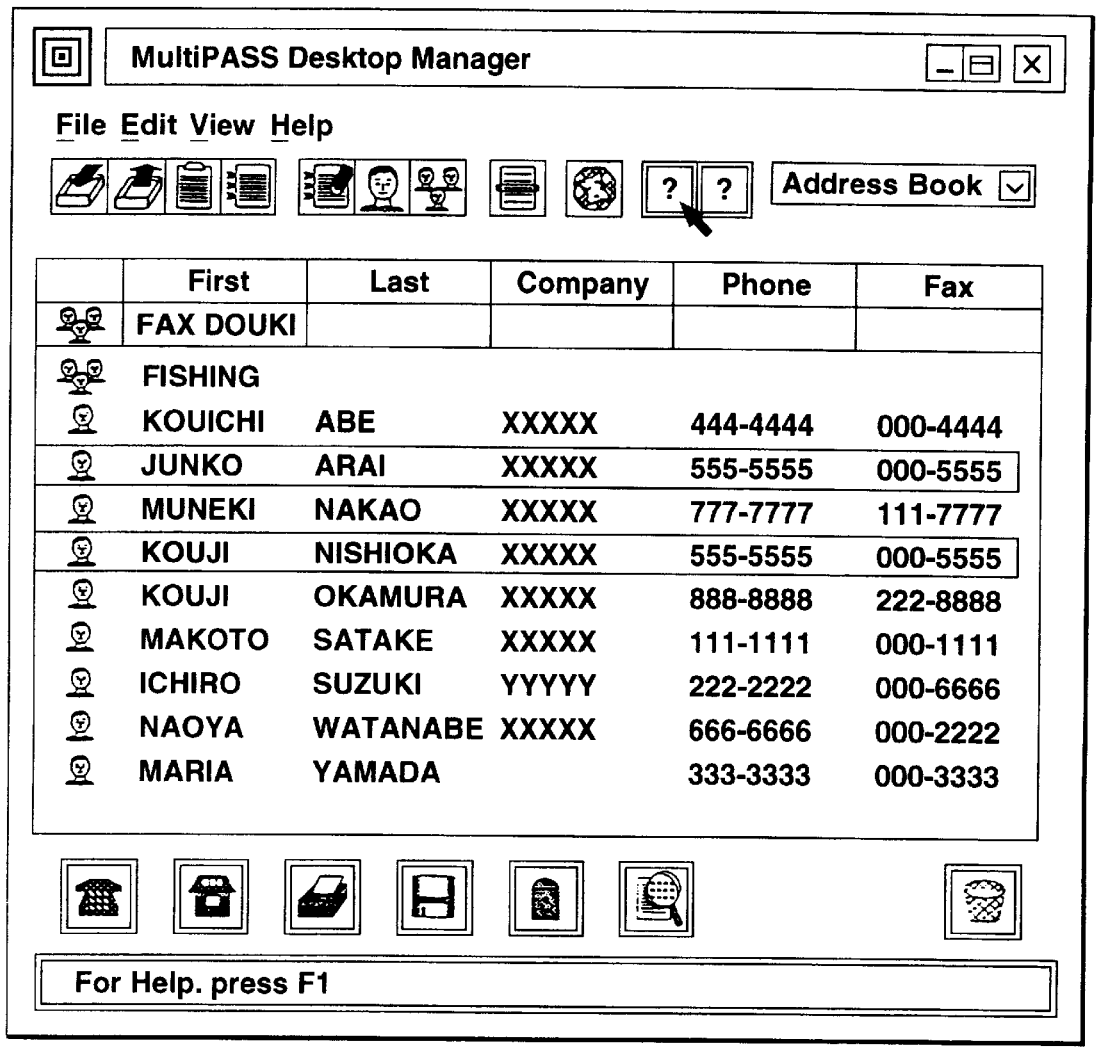
FIG. 17 is a diagram illustrating an example of display where disabled communication partners are subjected to halftone dot meshing in the dial input dialog box shown in FIG. 15.

FIG. 17 is a diagram illustrating an example of such display. In FIG. 17, discrimination from other communication partners is performed according to half-tone dot meshing display instead of dimmer display which is difficult to realize in a drawing. Then, the processing of disabling error dialing at the PC side is terminated.

According to the above-described steps, the subroutine processing of disabling error dialing at the PC side, in which communication partners in the telephone directory at the PC side where the same telephone number as the assigned telephone number is registered are disabled, is executed.

Figure 13:
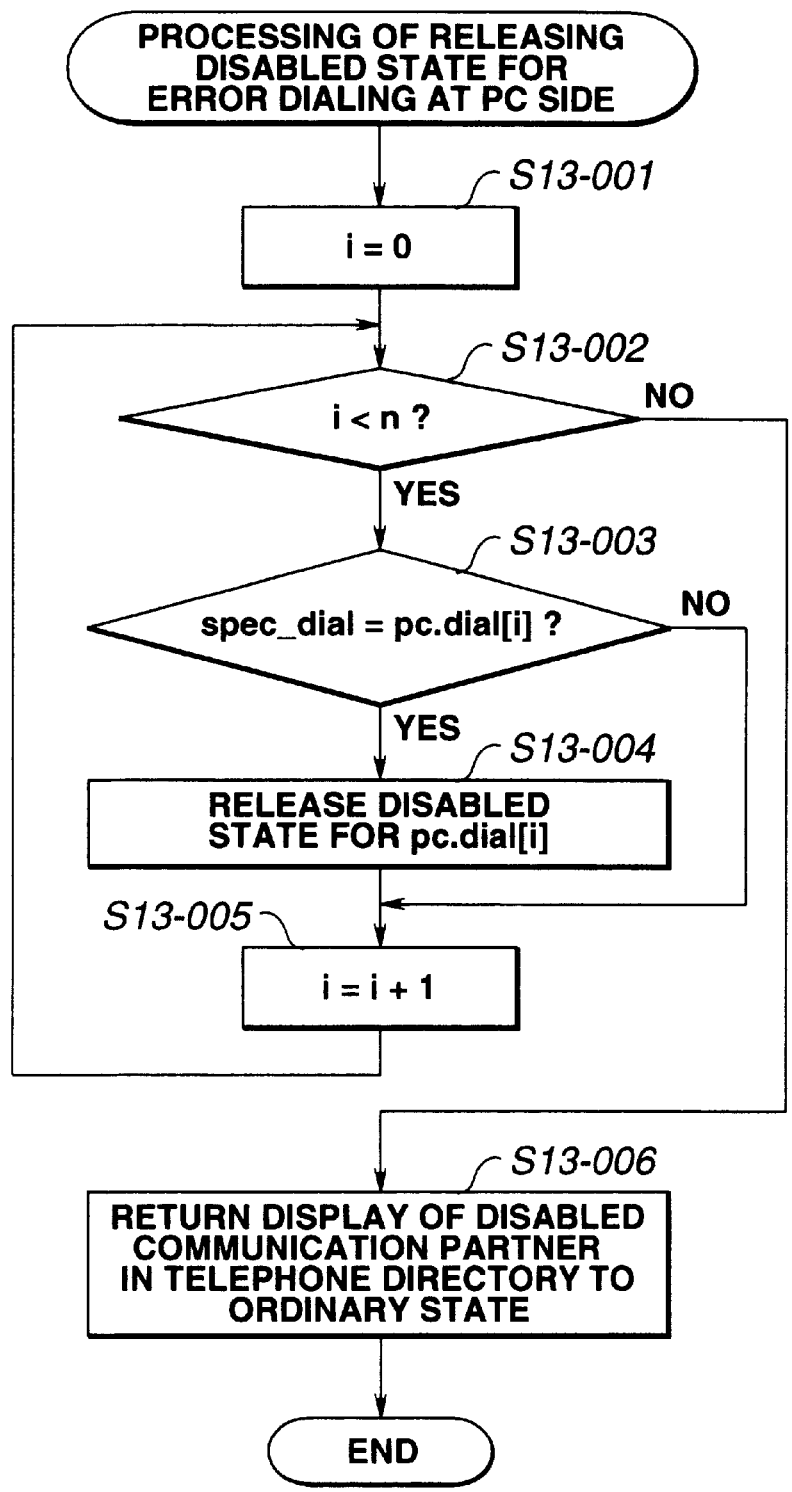
FIG. 13 is a flowchart illustrating the detail of subroutine processing of releasing a disabled state for a communication partner in the telephone directory at the PC side in the first embodiment.

FIG. 13 is a flowchart illustrating the detail of subroutine processing described in step S9-005 shown in FIG. 5 which is executed based on a request to release a disabled state from the facsimile apparatus described in step S2-005 shown in FIG. 2, i.e., processing of removing a disabled state of a communication partner in the telephone directory at the PC side where the same telephone number as the assigned telephone number is registered, performed in step S9-005.

First, in step S13-001, index i for sequentially accessing sequentially registered communication partners is initialized to 0, and loop processing in and after step S13-002 is executed.

In step S13-002, it is determined if index i is less than the number n of sequentially registered communication partners. If the result of the determination in step S13-002 is affirmative, the process proceeds to step S13-003. If the result of the determination in step S13-002 is negative, the process proceeds to step S13-006.

In step S13-003, it is determined if the assigned telephone number spec_dial equals the telephone number pc.dial[i] of the i-th registered communication partner. At that time, as in the processing of releasing a disabled state of error dialing in the facsimile apparatus, comparison is performed by removing null symbols which are not actually transmitted to the network at calling, and special characters, such as parentheses, underlines and the like. If the result of the determination in step S13-003 is affirmative, the process proceeds to step S13-004. If the result of the determination in step S13-003 is negative, the process proceeds to step S13-005.

In step S13-004, in order to release the disabled state of the communication partner in the telephone directory where the same telephone number as the assigned telephone number is registered, a value indicating a state other than a disabled state is set in an attribute region corresponding to the i-th registered communication partner, and the process proceeds to step S13-005.

In step S13-005, index i is incremented by one, and the process returns to step S13-002 to repeat the loop processing.

In step S13-006, from among communication partners displayed as in a disabled state in the dial input dialog box shown in FIG. 17 in step S12-006, communication partners whose disabled state have been released in step S13-004 are returned to ordinary display. For example, if the two communication partners subjected to half-tone dot meshing display indicating the disabled state in FIG. 17 are returned to ordinary display, the display shown in FIG. 15 is obtained. Then, the processing of releasing the disabled state of error dialing at the PC side is terminated.

According to the above-described steps, the subroutine processing of releasing a disabled state of error dialing at the PC 15 side, in which the disabled state of communication partners in the telephone directory at the PC 15 side where the same telephone number as the assigned telephone number is registered is released, is executed.

FIG. 14 is a flowchart illustrating processing of controlling the status of an item of transmission based on an instruction from the PC 15 which has been entered in transmission queue at the facsimile apparatus 1 side according to the transmission engagement processing at the PC 15 side described in FIG. 9, at the PC side. This processing is periodically executed at a predetermined time interval until contents indicating that the item of transmission based on the instruction of the PC 15 is deleted from the transmission queue of the facsimile apparatus 1 are acquired.

First, in step S14-001, it is determined if an item of transmission based on an instruction from the PC 15 for which enqueuing in transmission queue of the facsimile apparatus 1 is enabled is present. If the result of the determination in step S14-001 is affirmative, the process proceeds to step S14-002. If the result of the determination in step S14-001 is negative, the presence of such an item is monitored at a predetermined time interval until such an item is obtained.

In step S14-002, acquisition of the status of the item of transmission identified by a transmission engagement number is requested to the facsimile apparatus using this number, and the process proceeds to step S14-003.

In step S14-003, the contents of the transmission queue and the status of the item of transmission are received from the facsimile apparatus side as a response. If the transmission status indicates that the transmission has been normally ended, the process returns to step S14-001. If the transmission status indicates that the transmission is being performed, the process returns to step S14-002, where acquisition of the status of the item of transmission is again requested to the facsimile apparatus. If the transmission status indicates failure of transmission, the process proceeds to step S14-004.

In step S14-004, the communication control information stored in step S3-011 shown in FIG. 3 is received as a response from the facsimile apparatus side, and it is determined if the communication control information is "error dialing". If the result of the determination in step S14-004 is affirmative, the process proceeds to step S14-005. If the result of the determination in step S14-004 is negative, the process proceeds to step S14-010.

In step S14-005, the value "err" of a counter for counting the number of error dialing operations prepared in a state of being initialized to 0 for each item of transmission is incremented by one, and the process proceeds to step S14-006.

In step S14-006, it is determined if the value "err"0 of the error-dialing counter is less than 2. If the result of the determination in step S14-006 is affirmative, the process proceeds to step S14-010. If the result of the determination in step S14-006 is negative, the process proceeds to step S14-007.

Figure 18:
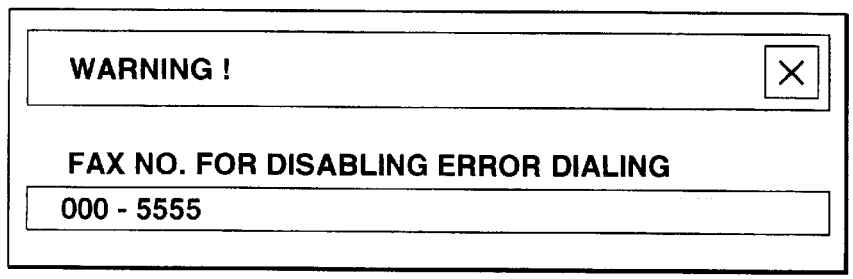
FIG. 18 is a diagram illustrating an example of display of warning for disabled dialing used in the first embodiment.

In step S14-007, an error alarm for alarming the user that the communication partner for which transmission has been instructed from the PC results in error dialing is ringed, and a dialog box for disabling error dialing as shown in FIG. 18 is popped up on the display picture surface as warning display, to alarm the user that the communication partner is disabled.

In step S14-008, as described in detail in FIG. 12, the communication partner where the same telephone number as the telephone number of the concerned item of transmission is registered is disabled, and the process proceeds to step S14-009.

In step S14-009, as described in detail in FIG. 7, the one-touch/abbreviation dial key where the same telephone number as the telephone number of the item of transmission determined as error dialing is registered is disabled, and the process proceeds to step S14-013.

The processing of step S14-010 is executed when the result of the determination in step S14-004 is negative, or when the result of the determination in step S14-006 is affirmative. In step S14-010, the value "redial" of the counter for counting the number of redialing operations prepared in a state of being initialized to 0 for each item of transmission is incremented by one, and the process proceeds to step S14-011.

In step S14-011, it is determined if the value "redial" of the redialing-number counter is less than a predetermined number n. If the result of the determination in step S14-011 is affirmative, the process proceeds to step S14-012. If the result of the determination in step S14-011 is negative, the process proceeds to step S14-013.

In step S14-012, the item of transmission from queue of the facsimile apparatus side is again enqueued in the last of queue at the PC side, and the process proceeds to step S14-013.

In step S14-013, an item of transmission at the head of the queue of the PC side is enqueued in the last of the queue of the facsimile apparatus side, and the process returns to step S14-001 which is the first step of the transmission control processing at the PC side.

According to the above-described steps, the processing of periodically acquiring the status of the item of transmission based on an instruction of the PC, controlling the error-dialing counter in accordance with communication control information, processing error dialing at the PC side, controlling the redialing counter, and then controlling transmission queues at the PC side and the facsimile apparatus side, and the like is executed.

Next, a description will be provided of other embodiments of the present invention.

In the first embodiment, calling disabling processing is realized by setting a value indicating a disabled state in an attribute region corresponding to a one-touch/abbreviation dial of the facsimile apparatus 1, and processing of disabling an instruction of facsimile transmission from the PC 15 is realized by setting a value indicating a disabled state in an attribute region corresponding to each communication partner in the telephone directory at the PC 15. In the first embodiment, when setting a disabled state, a telephone number ineffective for facsimile transmission is compared with the telephone numbers of all one-touch/abbreviation dial keys of the facsimile apparatus and telephone numbers registered in all communication partners of the telephone directory of the PC side, and one-touch/abbreviation dial keys or communication partners in the telephone directory at the PC side where the same telephone number is registered are disabled.

The above-described calling disabling processing and facsimile-transmission-instruction disabling processing may also be realized according to a method of controlling a list of disabled telephone numbers caused by error dialing both at the facsimile apparatus side and the PC side. That is, when, for example, a one-touch/abbreviation dial key of the facsimile apparatus 1 has been selected, by comparing the list of disabled telephone numbers caused by error dialing which is controlled in the S-RAM 4 of the facsimile apparatus 1 with the telephone number registered in the selected one/touch/abbreviation dial key, determination of a disabled state can be performed.

Processing at the PC side may be performed in the same manner. In this case, by utilizing, for example, processing of notifying a result of determination of a disabled state (step S6-008 shown in FIG. 6, and step S14-002 shown in FIG. 14), and processing of notifying communication partners for which calling is disabled so that the contents of lists of disabled telephone numbers caused by error dialing controlled at the facsimile apparatus side and the PC side always coincide with each other, while paying attention to the possibility that telephone numbers whose disabled state due to error dialing cannot be stored arise depending on the size of the list for controlling disabled telephone numbers, synchronism between the disabled states in the facsimile apparatus 1 and the PC 15 can be easily maintained.

In the first embodiment, in order to realize processing of notifying release of a disabled state of calling, in step S2-005, a method of adding information relating to the telephone number of a disabled one-touch/abbreviation dial key in order to enable all possibly disabled addresses having the same telephone number as the one-touch/abbreviation dial key in the telephone directory controlled by the application software in the PC 15, i.e., to release the disabled state of the addresses, and requesting the PC 15 to release the disabled state of the telephone number is shown. However, if the contents of the lists of disabled telephone numbers caused by error dialing controlled at both of the facsimile apparatus 1 side and the PC 15 side always coincide with each other, it is also possible to add a number in the list instead of the telephone-number information, and to request release of the disabled state of the concerned telephone number.

In the first embodiment, communication partners for whom an instruction of transmission is disabled are indicated to the user by performing dimmer display (half-tone dot meshing display in FIG. 17) for these partners in the telephone directory at the PC side as processing of indicating communication partners for whom an instruction of transmission is disabled. However, instead of dimmer display (half-tone dot meshing display in FIG. 17), for example, the type, the size or the color of the font may be changed, or a pattern or marking is provided at the background.

According to the above-described embodiments, in a system in which a PC and a facsimile apparatus are connected to each other, and which can execute facsimile transmission based on an instruction from the PC, it is possible to perform determination of error dialing (error calling), and processing of disabling dialing (calling) for facsimile transmission executed by the facsimile apparatus based on an instruction from the PC.

That is, in most of facsimile apparatuses in which a PC and a facsimile apparatus are connected to each other, software at the PC side controls a telephone directory having the same effect as one-touch dial keys in stand-alone facsimile apparatuses. When facsimile transmission instructed using the telephone directory at the PC side results in error dialing, the telephone directory at the PC side can be disabled as in the case of the stand-alone facsimile apparatuses.

Furthermore, it is also possible to apply a disabled state due to error dialing applied to a one-touch dial key of the facsimile apparatus to a telephone directory at the PC side, and apply the disabled state due to error dialing applied to the telephone directory at the PC side to the one-touch dial key of the facsimile apparatus, and to synchronize the disabled states of the dialing at both sides.

In a facsimile system of a type in which, during image transmission, calling is performed by transferring only information relating to the address and the like of a communication partner from a PC to a facsimile apparatus, and then transmission is performed while sequentially transferring image information from the PC to the facsimile apparatus, it is also possible to construct the above-described system of synchronizing the disabled states of dialing at both sides.

It is also possible to assuredly transmit information relating to an address disabled at the facsimile apparatus side or a communication partner for whom an instruction of transmission from the PC is disabled to the user using alarm means or indication means, and to assuredly transmit information relating to a communication partner whose disabled state has been released at the facsimile apparatus side or a communication partner for whom a disabled state for an instruction of transmission from the PC has been released by returning display of such a partner to ordinary display.

When the user selects a communication partner for whom an instruction of transmission is disabled, it is possible to ask the user to select whether or not the disabled state is to be released, so that an instruction of transmission can be performed for a communication partner for whom the state of error dialing has been released. Hence, it is possible to provide a convenient system which can flexibly perform processing depending on the status of a communication partner.

Figure 19:
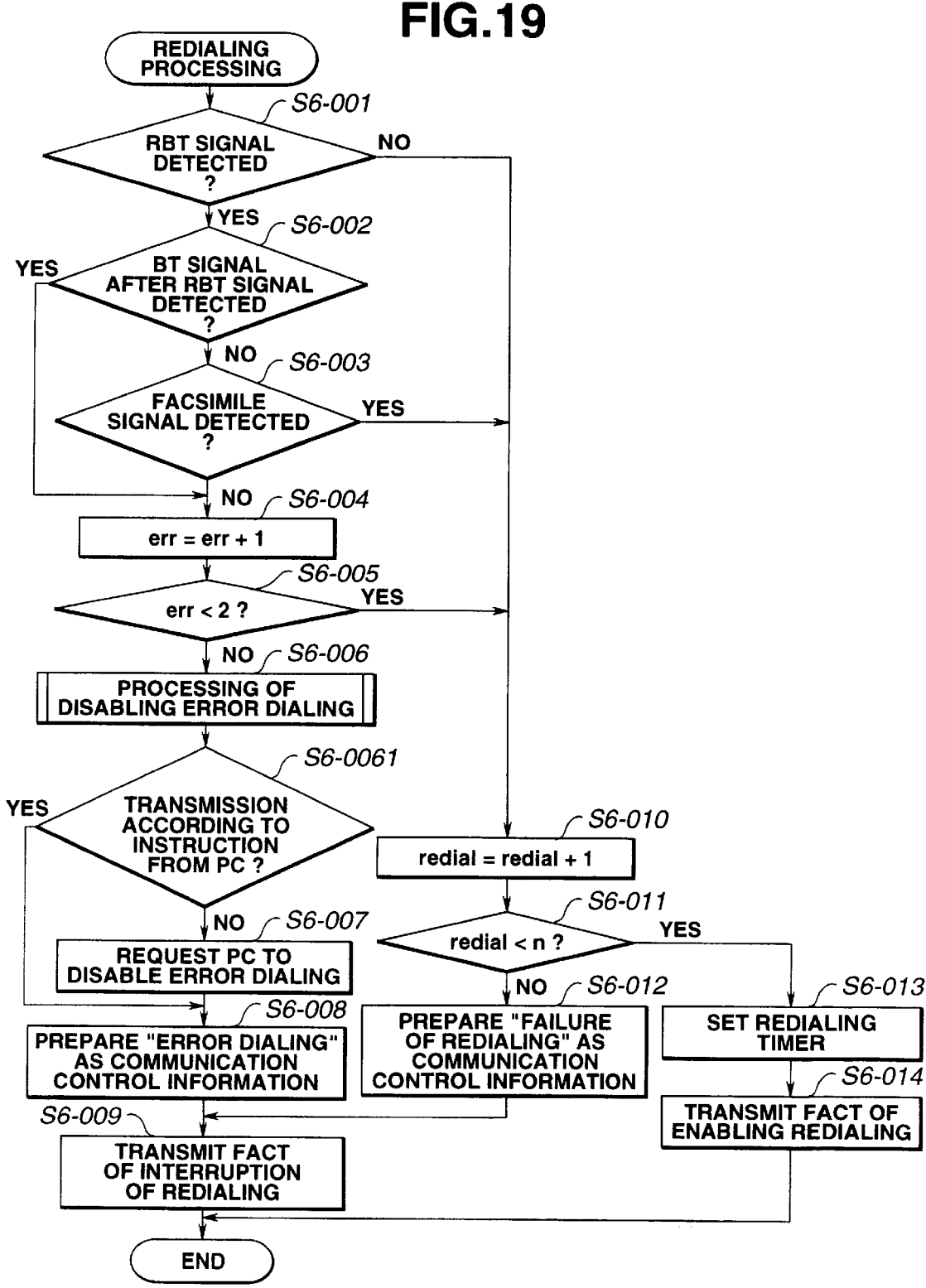
FIG. 19 is a flowchart illustrating a modification of the processing shown in the flowchart of FIG. 6.

As a modification of the first embodiment, the processing of step S6-0061 shown in the flowchart of FIG. 19 may be added between step S6-006 and step S6-007 shown in FIG. 6, and the processing of step S6-007 may be executed when transmission processing determined as error dialing is based on an instruction from the PC 15.

According to the above-described embodiments, since determination processing and determination-result counting processing by the facsimile apparatus are also utilized for determining error dialing for facsimile transmission based on an instruction from the PC, there is a secondary effect of causing less correction in software at the facsimile apparatus side and the PC side.

It is also possible to apply a disabled state due to error dialing applied to a one-touch dial key of the facsimile apparatus to the telephone directory of the PC side, to apply a disabled state due to error dialing applied to the telephone directory at the PC side to a one-touch dial key of the facsimile apparatus, and to synchronize the disabled states for dialing at both of the PC and the facsimile apparatus.

When the PC 15 is connected to a LAN (local area network), and a terminal on the LAN utilizes the telephone directory by accessing the PC 15, it is also possible to perform display so that the telephone number and the type of communication in a disabled state due to error dialing can be observed on the terminal on the LAN.

In the foregoing embodiments, G3-mode facsimile communication is adopted as the type of communication to be disabled, G4-mode facsimile communication, a telephone for conversation, Internet communication, a visual telephone or the like may, of course, be adopted.

In such a case, of course, a disabled state of an instruction to call a communication partner is notified to a calling apparatus (the facsimile apparatus 1) using a parameter adapted to the type of communication (for example, an Internet address) as information relating to the communication partner.

The objects of the present invention may also be achieved by supplying a computer (a CPU or a MPU) within an apparatus or a system connected to various kinds of devices so as to operate them in order to realize the functions of the above-described embodiments with program codes of software for realizing the functions of the embodiments, and operating the devices in accordance with programs stored in the computer.

In such a case, the program codes themselves realize the functions of the embodiments, so that the program codes themselves, and means for supplying the computer with the program codes, such as a storage medium storing the program codes, constitute the present invention.

For example, a floppy disk, a hard disk, an optical disk, a magnetooptical disk, a CD(compact-disk)-ROM, a magnetic tape, a nonvolatile memory card, a ROM or the like may be used as the storage medium for storing the program codes.

Such program codes are, of course, included in the embodiments of the present invention not only when the functions of the above-described embodiments are realized by executing supplied program codes by a computer, but also when the program codes realize the functions of the above-described embodiments in cooperation with an OS (operating system), other application software or the like operating in a computer.

The present invention may, of course, be applied to a case in which, after storing supplied program codes in a memory provided in a function expanding card of a computer or in a function expanding unit connected to the computer, a CPU or the like provided in the function expanding board or the function expanding unit performs a part or the entirety of actual processing, and the functions of the above-described embodiments are realized by the processing.

The individual components designated by blocks in the drawings are all well-known in the data communication system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data communication system in which a data communication apparatus and an information processing terminal are connected to each other via an interface, and said data communication apparatus executes data communication in accordance with an instruction from said information processing terminal, said data communication apparatus comprising:

identification means for identifying if data communication processing after automatic calling to an address instructed from said information processing terminal is appropriate or inappropriate; and transmission means for transmitting, when said identification means has identified that the processing is inappropriate, information indicating the result of the identification to said information processing terminal, and said information processing terminal comprising:

means for disabling an instruction of data communication to the address for said data communication apparatus based on the identification-result information which has been transmitted by said transmission means.

2. A data communication system according to claim 1, wherein said data communication apparatus further comprises retrying means for retrying a predetermined number of data communication operations until data communication to the address instructed from said information processing terminal is normally performed, and wherein, when said retrying means has retried the predetermined number of data communication operations, said identification means identifies that the data communication processing to the address is inappropriate as a result of repetition of a predetermined number of responses indicating ineffectiveness of the data communication from the called address.

3. A data communication system according to claim 1, wherein said data communication apparatus further comprises:

response determination means for determining if a response signal effective in data communication has been received from the address called in order to perform data communication; and first counting means for counting a number of determinations by said response determination means that an effective response signal has not been received, wherein said identification means identifies that the data communication processing to the address is inappropriate in accordance with a result of counting by said first counting means.

4. A data communication system according to claim 3, wherein said data communication apparatus further comprises means for disabling calling for data communication to the address when said identification means has identified that the data communication processing to the called address is inappropriate.

5. A data communication system according to claim 3, wherein said information processing terminal further comprises second counting means for counting a number of operations of receiving the identification-result information from said data communication terminal, and wherein said disabling means determines if an instruction of data communication to the address for said data communication apparatus is appropriate, and disables an instruction of data communication to the address for said data communication apparatus in accordance with a result of the determination.

6. A data communication system according to claim 5, wherein said information processing terminal further comprises means for notifying, when said disabling means has disabled an instruction of data communication to the address, information relating to the disabled address to said data communication apparatus, and wherein said data communication apparatus receives the address information notified from said information processing terminal, and disables calling for data communication to the address corresponding to the address information.

7. A data communication system according to claim 4, wherein a status of setting a disabled state of calling in said data communication apparatus and a status of setting a disabled state of calling in said information processing terminal are applied to each other.

8. A data communication system according to claim 4, wherein said data communication apparatus further comprises first releasing means for releasing setting of a disabled state for the address for which calling is disabled, and wherein said information processing terminal further comprises second releasing means for releasing a status of setting a disabled state for the address for which an instruction of data communication to said data communication apparatus is disabled, and wherein the statuses of setting disabled states in said data communication apparatus and said information processing terminal can be independently released.

9. A data communication system according to claim 8, wherein said data communication apparatus further comprises means for notifying said information processing terminal of information relating to the address for which the status of setting a disabled state of calling has been released by said first releasing means, and wherein said information processing terminal releases the setting of disabling an instruction to the address corresponding to information relating to the address for which the setting of the disabled state of calling has been released received from said data communication apparatus based on the address information.

10. A data communication system according to claim 8, wherein said information processing terminal further comprises means for notifying said data communication apparatus of information relating to the address for which the status of setting the disabled state of an instruction has been released by said second releasing means, and wherein said data communication apparatus releases the status of setting of disabling calling to the address corresponding to information relating to the address for which the status of setting the disabled state of an instruction has been released received from said information processing terminal based on the address information.

11. A data communication system according to claim 8, wherein release of setting of a disabled state for an address in said data communication apparatus, and release of setting of a disabled state for an instruction to an address in said information processing terminal are applied to each other.

12. A data communication system according to claim 1, wherein said information processing terminal further comprises alarm means for alarming to disable an instruction of data communication when setting the disabled state of an instruction.

13. A data communication system according to claim 12, wherein said alarm means alarms to diable an instruction of data communication by displaying the address for which an instruction is to be disabled so as to be identified.

14. A data communication system according to claim 12, wherein said alarm means alarms to diable an instruction of data communication by generating an error alarming sound.

15. A data communication system according to claim 1, wherein said information processing terminal further comprises:
   registration means for registering in advance information relating to some addresses; and
   means for displaying addresses for which an instruction of data communication has been disabled from among the addresses registered in said registration means so as to be discriminated from other addresses.

16. A data communication system according to claim 15, wherein said information processing terminal discriminates information relating to the addresses for which an instruction of data communication has been disabled from information relating to other addresses according to dimmer display.

17. A data communication system according to claim 15, wherein said information processing terminal performs the discrimination by changing a font of information relating to the addresses for which an instruction of data communication has been disabled from a font of information relating to the other addresses.

18. A data communication system according to claim 8, wherein said information processing terminal further comprises:
   registration means for registering in advance information relating to some addresses;
   address selection means for instructing data communication by selecting a desired address from among the addresses registered in said registration means;

means for displaying setting of a disabled state of the address for which an instruction of data transmission is disabled by said instruction disabling means so as to be identified; and
   means for returning display of the address for which setting of the disabled state is released by said second releasing means to a state before the setting of the disabled state.

19. A data communication system according to claim 18, wherein said information processing terminal further comprises means for displaying, when the address for which a disabled state of an instruction of data communication is set has been selected by said address selection means, to allow selection whether or not the setting of the disabled state for the selected address is to be released, and wherein said second releasing means releases the setting of the disabled state of an instruction in response to a manual instruction for the display for the selection of release.

20. A method for controlling a data communication system in which a data communication apparatus and an information processing terminal are connected to each other via an interface, and the data communication apparatus executes data communication in accordance with an instruction from the information processing terminal,
   wherein the data communication apparatus identifies if data communication processing after automatic calling to an address instructed from the information processing terminal is appropriate, and notifies, when it has been identified that the data communication processing is inappropriate, information indicating a result of the identification to the information processing terminal, and
   wherein the information processing terminal disables an instruction of data communication to the address for the data communication apparatus based on the identification-result information received from the data communication apparatus.

21. A method according to claim 20, wherein the data communication apparatus retries a predetermined number of data communication operations until data communication to the address instructed from the information processing terminal is normally performed, and identifies, when data communication operations have been retried the predetermined number of times, that the data communication processing to the address is inappropriate as a result of repetition of a predetermined number of responses indicating ineffectiveness of the data communication from the called address.

22. A method according to claim 20, wherein the data communication apparatus determines if a response signal effective in data communication has been received from the address called in order to perform data communication, counts a number of determinations that an effective response signal has not been received, and identifies that the data communication processing to the address is inappropriate in accordance with a result of the counting.

23. A method according to claim 22, wherein the the communication apparatus disables calling for data communication to the address when it has identified that the data communication processing to the called address is inappropriate.

24. A method according to claim 22, wherein the information processing terminal counts a number of operations of receiving the identification-result information from the data communication terminal, determines if an instruction of data communication to the address for the data communication apparatus is appropriate based on a result of the counting, and disables an instruction of data communication to the address for the data communication apparatus in accordance with a result of the determination.

25. A method according to claim 24, wherein the information processing terminal notifies, when an instruction of data communication to the address has been disabled, information relating to the disabled address to the data communication apparatus, and wherein the data communication apparatus receives the address information notified from the information processing terminal, and disables calling for data communication to the address corresponding to the address information.

26. A method according to claim 23, wherein a status of setting a disabled state in the data communication apparatus and a status of setting a disabled state of calling in the information processing terminal are applied to each other.

27. A method according to claim 23, wherein the data communication apparatus includes a first releasing processing of releasing setting of a disabled state for the address for which calling is disabled, and wherein the information processing terminal includes a second releasing processing of releasing a status of setting a disabled state for the address for which an instruction of data communication to the data communication apparatus is disabled, and wherein the statuses of setting disabled states in the data communication apparatus and the information processing terminal can be independently released.

28. A method according to claim 27, wherein the data communication apparatus notifies the information processing terminal of information relating to the address for which the status of setting a disabled state of calling has been released by said first releasing processing, and wherein the information processing terminal releases the setting of disabling an instruction to the address corresponding to information relating to the address for which the setting of the disabled state has been released received from the data communication apparatus based on the address information.

29. A method according to claim 27, wherein the information processing terminal notifies the data communication terminal of information relating to the address for which the status of setting a disabled state of an instruction has been released by said second releasing processing, and wherein the data communication apparatus releases the status of setting of disabling calling to the address corresponding to information relating to the address for which the status of setting the disabled state of an instruction has been released received from the information processing terminal based on the address information.

30. A method according to claim 27, wherein release of setting of a disabled state for an address in the data communication apparatus, and release of setting of a disabled state for an instruction to an address in the information processing terminal are applied to each other.

31. A method according to claim 20, wherein the information processing terminal alarms to disable an instruction of data communication when setting the disabled state of an instruction.

32. A method according to claim 31, wherein said alarming processing alarms to diable an instruction of data communication by displaying the address for which an instruction is to be disabled so as to be identified.

33. A method according to claim 31, wherein said alarming processing alarms to diable an instruction of data communication by generating an error alarming sound.

34. A method according to claim 20, wherein the information processing terminal registers in advance information relating to some addresses, and displays addresses for which an instruction of data communication has been disabled from among the registered addresses so as to be discriminated from other addresses.

35. A method according to claim 34, wherein the information processing terminal discriminates information relating to the addresses for which an instruction of data communication has been disabled from information relating to other addresses according to dimmer display.

36. A method according to claim 34, wherein the information processing terminal performs the discrimination by changing a font of information relating to the addresses for which an instruction of data communication has been disabled from a font of information relating to the other addresses.

37. A method according to claim 27, wherein the information processing terminal registers in advance information relating to some addresses, instructs data communication by selecting a desired address from among the registered addresses, displays setting of a disabled state of the address for which an instruction of data transmission is disabled so as to be identified, and returns display of the address for which setting of the disabled state is released by said second releasing processing to a state before the setting of the disabled state.

38. A method according to claim 37, wherein the information processing terminal displays, when the address for which a disabled state of an instruction of data communication is set has been selected, to allow selection whether or not the setting of the disabled state for the selected address is to be released, and wherein the second releasing means releases the setting of the disabled state of an instruction in response to a manual instruction for the display for the selection of release.

39. A method according to claim 20, wherein, when communication with a called communication partner cannot be performed, the data communication apparatus determines a type of communication, and notifies the information processing terminal of identification information indicating that data communication processing is inappropriate when the determined type of communication is data communication.

40. A storage medium storing a computer program executed by a computer of an information processing terminal which can be connected to a data communication apparatus via an interface, which transmits an instruction of data communication to the data communication apparatus via the interface, and which causes the data communication apparatus to perform data communication, said computer program comprising:

processing of, when the data communication apparatus has identified that data communication processing after automatic calling to an address instructed from the information processing terminal is inappropriate, receiving information relating to the result of the identification transmitted from the data communication apparatus via the interface, and disabling an instruction of data communication to the address for the data communication apparatus based on the received identification-result information.

41. A storage medium according to claim 40, wherein said computer program further comprises processing of counting a number of operations of receiving the identification-result information from the data communication terminal, determining if an instruction of data communication to the address for the data communication apparatus is appropriate, and disabling an instruction of data communication to the address for the data communication apparatus in accordance with a result of the determination.

42. A storage medium according to claim 41, wherein said computer program further comprises processing of notifying, when an instruction of data communication to the address is disabled, information relating to the disabled address to the data communication apparatus.

43. A storage medium according to claim 40, wherein said computer program further comprises processing of releasing a status of setting a disabled state of an instruction to the address for which an instruction of data communication to the data communication apparatus is disabled, and processing of notifying the data communication apparatus of information relating to the address for which the status of setting the disabled state of an instruction has been released by said releasing processing.

44. A storage medium according to claim 40, wherein said computer program further comprises processing of receiving, when the data communication apparatus has released setting of a disabled state of calling to an address, information relating to the address for which the status of setting the disabled state of calling has been released notified from the data communication apparatus via the interface, and releasing the setting of the disabled state of an instruction to the address corresponding to the received address information based on the address information.

45. A storage medium according to claim 40, wherein said computer program further comprises processing of alarming to disable an instruction of data communication when setting the disabled state of an instruction.

46. A storage medium according to claim 45, wherein said alarm processing alarms to diable an instruction of data communication by displaying the address for which an instruction is to be disabled so as to be identified.

47. A storage medium according to claim 45, wherein said alarm processing alarms to diable an instruction of data communication by generating an error alarming sound.

48. A storage medium according to claim 40, wherein said computer program further comprises processing of registering in advance information relating to some addresses, and processing of displaying addresses for which an instruction of data communication has been disabled from among the registered addresses so as to be discriminated from other addresses.

49. A storage medium according to claim 48, wherein said processing for discriminating display discriminates information relating to the addresses for which an instruction of data communication has been disabled from information relating to other addresses according to dimmer display.

50. A storage medium according to claim 48, wherein said processing for discriminating display performs the discrimination by changing a font of information relating to the addresses for which an instruction of data communication has been disabled from a font of information relating to the other addresses.

51. A storage medium according to claim 40, wherein said computer program further comprises:
   processing of registering in advance information relating to some addresses;
   processing of instructing data communication by selecting a desired address from among the registered addresses; and
   processing of displaying setting of a disabled state of the address for which an instruction of data transmission is disabled so as to be identified, and returning display of the address for which setting of the disabled state is released to a state before the setting of the disabled state.

52. A storage medium according to claim 51, wherein said computer program further comprises processing of displaying, when the address for which a disabled state of an instruction of data communication is set has been selected, to allow selection whether or not the setting of the disabled state for the selected address is to be released, wherein said releasing processing releases the setting of the disabled state of an instruction in response to a manual instruction for the display for the selection of release.

53. A data communication apparatus comprising:
   connection means for connecting to an information processing terminal;
   calling means for calling to an address instructed by the information processing terminal connected through said connection means;
   identification means for identifying whether a calling by said calling means is appropriate or inappropriate;
   setting means for setting said calling means so that calling to the address is disabled based on a result of identification by said identification means; and
   notification means for notifying to the information processing terminal connected through said connection means that said setting means has set said calling means so that calling to the address is disabled.

54. A data communication apparatus according to claim 53, further comprising an operation unit for inputting a manual instruction, wherein said setting means further sets said calling means so that calling according to an instruction from said operation unit is disabled.

55. A data communication apparatus according to claim 53, wherein said identification means identifies whether a facsimile communication to the address instruction by the information processing terminal is possible.

56. A controlling method of a data communication apparatus connected to an information processing terminal, comprising the steps of:
   receiving a transmission instruction from the information processing terminal;
   calling to an address based on the transmission instruction received from the information processing terminal in said receiving step;
   identifying whether a calling in said calling step is appropriate or inappropriate;
   setting the data communication apparatus so that calling to the address is disabled based on a result of identification in said identifying step; and
   notifying the information processing terminal that the data communication apparatus is set in said setting step so that the calling to the address is disabled.

57. A computer readable program, stored in a storage medium, for controlling a data communication apparatus connected to an information processing terminal to perform a method, said method comprising the steps of:
   receiving a transmission instruction from the information processing terminal;
   calling to an address based on the transmission instruction received from the information processing terminal in said receiving step;
   identifying whether a calling in said calling step is appropriate or inappropriate;
   setting the data communication apparatus so that calling to the address is disabled based on a result of identification in said identifying step; and
   notifying the information processing terminal that the data communication apparatus is set in said setting step so that calling to the address is disabled.

58. A computer readable program, stored in a storage medium, for controlling an information processing terminal connected to a data communication apparatus to perform a method, said method comprising the steps of:

sending a transmission instruction to the data communication apparatus for causing the data communication apparatus to transmit data;

detecting whether or not the data communication apparatus is set so that the transmission to the address according to the transmission instruction sent in said sending step is disabled; and setting the information processing terminal so that the transmission instruction to the address in said sending step is disabled in accordance with a result of detection in said detecting step.

59. A controlling method of an information processing terminal connected to a data communication apparatus, said method comprising the steps of:

sending a transmission instruction to the data communication apparatus for causing the data communication apparatus to transmit data;

detecting whether or not the data communication apparatus is set so that the transmission to the address according to the transmission instruction sent in the sending step is disabled; and setting the information processing terminal so that the transmission instruction to the address in the sending step is disabled in accordance with a result of detection in the detecting step.

60. A controlling method of a data processing system comprising a data communication apparatus and an information processing terminal, wherein the data communication apparatus calls based on an instruction from the information processing terminal and an operation unit of the data communication apparatus identifies whether a calling to an address based on the instruction is appropriate or inappropriate, and sets the data processing system so that inappropriate calling to the address is disabled;

wherein the information processing terminal instructs calling to the data communication apparatus, identifies whether calling to the address based on the instruction is appropriate or inappropriate, and sets the data processing system so that the instruction of inappropriate calling to the address is disabled, and wherein setting of disabling by the information processing terminal and setting of disabling by the communication apparatus are synchronized.

* * * * *

UNITED STATES PATENT AND TRADEMARK OFFICE
CERTIFICATE OF CORRECTION

PATENT NO. : 6,049,597
DATED : April 11, 2000
INVENTOR(S) : Makoto Satake et al.

It is certified that error appears in the above-identified patent and that said Letters Patent is hereby corrected as shown below:

COLUMN 6

Line 45, "abberviation" should read --abbreviation--.

COLUMN 7

Line 31, "caliting" should read -- calling--.

COLUMN 8

Line 54, "a" should read -- an--.

COLUMN 11

Line 4, "of" should read --if--.

COLUMN 12

Line 9, "15.in" should read --15 in--.

UNITED STATES PATENT AND TRADEMARK OFFICE
CERTIFICATE OF CORRECTION

PATENT NO.   : 6,049,597
DATED        : April 11, 2000
INVENTOR(S)  : Makoto Satake et al.

It is certified that error appears in the above-identified patent and that said Letters Patent is hereby corrected as shown below:

COLUMN 17

Line 42, ""err"0" should read --"err"--.

COLUMN 23

Line 32, "diable" should read --disable--.

Line 36, "diable" should read --disable--.

COLUMN 25

Line 59, "diable" should read --disable--.

Line 63, "diable" should read --disable--.

COLUMN 27

Line 28, "diable" should read --disable--.

UNITED STATES PATENT AND TRADEMARK OFFICE
CERTIFICATE OF CORRECTION

PATENT NO. : 6,049,597
DATED : April 11, 2000
INVENTOR(S) : Makoto Satake et al.

It is certified that error appears in the above-identified patent and that said Letters Patent is hereby corrected as shown below:

COLUMN 27 CONTINUED

Line 32, "diable" should read --disable--.

Signed and Sealed this

Fifth Day of June, 2001

*Attest:*

*Attesting Officer*

NICHOLAS P. GODICI

*Acting Director of the United States Patent and Trademark Office*